United States Patent
White et al.

(10) Patent No.: US 10,895,912 B2
(45) Date of Patent: Jan. 19, 2021

(54) APPARATUS AND A METHOD FOR CONTROLLING A HEAD-UP DISPLAY OF A VEHICLE

(71) Applicant: Jaguar Land Rover Limited, Coventry (GB)

(72) Inventors: Stuart White, Coventry (GB); Lee Skrypchuk, Coventry (GB); Claudia Krehl, Coventry (GB); Robert Hardy, Coventry (GB); Jim Braithwaite, Coventry (GB)

(73) Assignee: JAGUAR LAND ROVER LIMITED, Warwickshi (GB)

( * ) Notice: Subject to any disclaimer, the term of this patent is extended or adjusted under 35 U.S.C. 154(b) by 0 days.

(21) Appl. No.: 16/473,188

(22) PCT Filed: Jan. 30, 2018

(86) PCT No.: PCT/EP2018/052296
§ 371 (c)(1),
(2) Date: Jun. 24, 2019

(87) PCT Pub. No.: WO2018/145958
PCT Pub. Date: Aug. 16, 2018

(65) Prior Publication Data
US 2019/0317600 A1    Oct. 17, 2019

(30) Foreign Application Priority Data
Feb. 13, 2017   (GB) .................................. 1702309.4

(51) Int. Cl.
*B60Q 1/00*      (2006.01)
*G06F 3/01*      (2006.01)
(Continued)

(52) U.S. Cl.
CPC ............ *G06F 3/013* (2013.01); *G01C 21/365* (2013.01); *G01C 21/3647* (2013.01); *G02B 27/0179* (2013.01); *G02B 2027/0181* (2013.01)

(58) Field of Classification Search
CPC ................ G06F 3/013; G02B 27/0179; G02B 2027/0181; G02B 27/01; G02B 27/0093;
(Continued)

(56) References Cited

U.S. PATENT DOCUMENTS

| 2010/0164702 | A1 | 7/2010 | Sasaki et al. |
| 2012/0170130 | A1 | 7/2012 | Sasaki et al. |

(Continued)

FOREIGN PATENT DOCUMENTS

| DE | 102 36 221 C1 | 11/2003 | |
| EP | 1 521 059 A1 | 4/2005 | |
| EP | 1521059 A1 * | 4/2005 | ........... G01C 21/365 |

OTHER PUBLICATIONS

Patents Act 1977: Combined Search and Examination Report under Sections 17 and 18(3), UKIPO Application No. GB1702309.4, dated Aug. 15, 2017, 5 pp.

(Continued)

*Primary Examiner* — Tanmay K Shah
(74) *Attorney, Agent, or Firm* — Miller Nash Graham & Dunn LLP

(57) ABSTRACT

An apparatus (101), a method (1000), a system (120), a vehicle (103), a computer program (904) and a non-transitory computer readable medium (906) for controlling ahead-up display (102) of a vehicle (103) are disclosed. The apparatus (101) comprises control means (104) configured to obtain positional data representative of a position of an eye (105) of a user (106) of the vehicle (103), obtain environment data representative of the environment (107) external to the vehicle (103); and obtain status data repre- (Continued)

sentative of a current position (803) of the vehicle (103). The control means is also configured to determine a proposed position (804) and proposed orientation in dependence on the environment data and the status data, and in dependence on the proposed position (804), the proposed orientation and the positional data, generate image data for the head-up display (102) for causing the head-up display (102) to display a virtual object (108) so as to appear at the proposed position (804) and with the proposed orientation with respect to the environment (107).

20 Claims, 14 Drawing Sheets

(51) Int. Cl.
*G01C 21/36* (2006.01)
*G02B 27/01* (2006.01)

(58) Field of Classification Search
CPC .. G01C 21/365; G01C 21/3647; G06T 19/006
USPC ...................................................... 340/425.5
See application file for complete search history.

(56) References Cited

U.S. PATENT DOCUMENTS

| 2014/0267402 | A1 | 9/2014 | Hing et al. |
| 2015/0062168 | A1 | 3/2015 | Ng-Thow-Hing et al. |
| 2015/0301592 | A1* | 10/2015 | Miller .................... G06F 3/011 345/156 |
| 2016/0327402 | A1 | 11/2016 | Funabiki et al. |
| 2018/0024354 | A1* | 1/2018 | Shibata .................... G08G 1/16 345/7 |

OTHER PUBLICATIONS

Patents Act 1977: Combined Search and Examination Report under Sections 17 and 18(3), UKIPO Application No. GB1801490.2, dated Jun. 27, 2018, 6 pp.
International Search Report and Written Opinion of the International Searching Authority, International Application No. PCT/EP2018/052296, dated May 4, 2018, 14 pp.

\* cited by examiner

US 10,895,912 B2

APPARATUS AND A METHOD FOR CONTROLLING A HEAD-UP DISPLAY OF A VEHICLE

RELATED APPLICATIONS

This application is a 35 U.S.C. § 371 national stage application of PCT Application No. PCT/EP2018/052296, filed on Jan. 30, 2018, which claims priority from Great Britain Patent Application No. 1702309.4, filed on Feb. 13, 2017, the contents of which are incorporated herein by reference in their entireties. The above-referenced PCT International Application was published in the English language as International Publication No. WO 2018/145958 A1 on Aug. 16, 2018.

TECHNICAL FIELD

The present disclosure relates to an apparatus and a method for controlling a head-up display of a vehicle. In particular, but not exclusively it relates to an apparatus and a method for controlling a head-up display of a road vehicle such as a car.

Aspects of the invention relate to an apparatus, a method, a system, a vehicle, a computer program and a non-transitory computer readable medium.

BACKGROUND

Head-up displays in vehicles are known which display, to a user of the vehicle, navigational guidance, driver assist systems, driving related vehicle information (e.g. speedometer, cruise control), and non-driving related information from the infotainment system (e.g. media, phone and settings content). A problem with some existing systems is that the displayed information may be difficult for some users to interpret. It has been proposed to display an image of a car or an alternative object/graphic in a head-up display, which the user is then able to follow along a route. However, a potential problem with such displays is that the displayed image does not appear to be correctly positioned in the exterior environment or is not animated correctly within the exterior environment. Furthermore, a potential problem is that the displayed car may appear to move out of a correct position when the user moves their head. Such characteristics may become distracting and become a source of irritation to the driver of the car.

It is an aim of the present invention to address one or more disadvantages of the prior art.

SUMMARY OF THE INVENTION

Aspects and embodiments of the invention provide an apparatus, a method, a system, a vehicle, a computer program and a non-transitory computer readable medium as claimed in the appended claims.

According to an aspect of the invention there is provided an apparatus for controlling a head-up display of a vehicle, the apparatus comprising control means configured to: obtain positional data representative of a position of an eye of a user of the vehicle; obtain environment data representative of the environment external to the vehicle; obtain status data representative of a current position of the vehicle; determine a proposed position and proposed orientation in dependence on the environment data and the status data; and in dependence on the proposed position, the proposed orientation and the positional data, generate image data for the head-up display for causing the head-up display to display a virtual object so as to appear at the proposed position and with the proposed orientation with respect to the environment.

This provides the advantage that the virtual object appears to be correctly positioned and oriented within the environment external to the vehicle even when the user moves his or her head. Also the virtual object may be animated in a way that is naturalistic and therefore conveys information to the user without causing a distraction.

In some embodiments, the status data is representative of a current orientation of the vehicle and the control means is configured to generate image data in dependence on the current orientation of the vehicle.

In some embodiments the image data generated for the head-up display is for causing the head-up display to display the virtual object so as to appear at the proposed position and with the proposed orientation with respect to the environment from the position of the an eye of a user of the vehicle.

According to another aspect of the invention there is provided an apparatus for controlling a head-up display of a vehicle, the apparatus comprising control means configured to: obtain positional data representative of a position of an eye of a user of the vehicle; obtain environment data representative of the environment external to the vehicle; obtain status data representative of a current position and current orientation of the vehicle; determine a proposed position for an object in dependence on the environment data and the status data; and in dependence on the proposed position, the positional data and current orientation of the vehicle, generate image data for the head-up display for causing the head-up display to display a virtual object so as to appear at the proposed position with respect to the environment.

This provides the advantage that the virtual object appears to be correctly positioned within the environment external to the vehicle even when the user moves his or her head.

In accordance with a further aspect of the present invention there is provided an apparatus for controlling a head-up display of a vehicle, the apparatus comprising an electronic processor, and an electronic memory device electrically coupled to the electronic processor and having instructions stored therein, wherein the processor is configured to access the memory device and execute the instructions stored therein such that it becomes configured to: obtain positional data representative of a position of an eye of a user of the vehicle; obtain environment data representative of the environment external to the vehicle; obtain status data representative of a current position and current orientation of the vehicle; determine a proposed position and proposed orientation for an object in dependence on the environment data and the status data; and in dependence on the proposed position, the proposed orientation, the positional data and current orientation of the vehicle, generate image data for the head-up display for causing the head-up display to display a virtual object so as to appear at the proposed position and with the proposed orientation with respect to the environment.

According to a still further aspect of the invention there is provided an apparatus for controlling a head-up display of a vehicle, the apparatus comprising control means configured to: obtain environment data representative of the environment external to the vehicle; obtain status data representative of a current position and current orientation of the vehicle; determine a proposed position and proposed orientation for an object within the environment in dependence on the environment data and the current position of the vehicle;

and in dependence on the proposed position, the proposed orientation and current orientation of the vehicle, generate image data for the head-up display for causing the head-up display to display a virtual object so as to appear at the proposed position and with the proposed orientation with respect to the environment.

This provides the advantage that the virtual object may be animated in a way that is naturalistic and therefore conveys information to the user without causing a distraction.

In some embodiments the environment data comprises route data representative of a route for the vehicle, the proposed position is on the route and the proposed orientation is indicative of a direction along the route.

This provides the advantage that the virtual object is able to guide a user along a route in a manner that is easily understood to all users.

In some embodiments the control means is configured to obtain speed data representative of a current speed of the vehicle; and determine the proposed position and proposed orientation in dependence on the environment data, the current position of the vehicle and the current speed of the vehicle.

This provides the advantage that the virtual object may be made to appear to travel in front of the vehicle at a speed that depends on the speed of the vehicle.

In some embodiments the control means is configured to adjust the apparent distance between the vehicle and the virtual object.

This provides the advantage that head-up display is able to convey an indication of required changes in speed in a naturalistic manner.

The term "apparent distance" is the distance to an object perceived by a user in view of any of the size, perspective, lateral or vertical position, of an image of the object as provided by a head-up display.

In some embodiments the control means is configured to: determine from the environment data a proposed speed for the vehicle at the proposed position; and to decrease the apparent distance between the vehicle and the virtual object in dependence on the current vehicle speed being greater than the proposed speed.

This provides the advantage that head-up display is able to convey an indication of required reduction in speed in a naturalistic manner.

In some embodiments the control means is configured to decrease the apparent distance between the vehicle and the virtual object in dependence on the environment data being indicative of the vehicle approaching a section of the road/route having at least one of: a legal speed limit which is less than the current speed of the vehicle; a bend; a road junction; and traffic moving slower than the vehicle.

In some embodiments the control means is configured to: determine from the environment data a proposed speed for the vehicle at the proposed position; and to increase the apparent distance between the vehicle and the virtual object in dependence on the current speed of the vehicle being less than the proposed speed.

This provides the advantage that head-up display is able to convey an indication that speed of the vehicle may be increased in a naturalistic manner.

In some embodiments the control means is configured to increase the apparent distance between the vehicle and the virtual object up to a predefined maximum value.

In some embodiments the control means is configured to increase the apparent distance between the vehicle and the virtual object in dependence on the environment data being indicative of the vehicle entering a section of the road/route having a legal speed limit which is greater than the current speed of the vehicle and/or in dependence on the environment data being indicative of the vehicle leaving a section of the road/route having at least one of: a bend; a road junction; and traffic moving slower than the vehicle.

In some embodiments the control means is configured to: adjust or reduce a brightness of the virtual object in dependence on a determination that an obstruction is at the proposed position or between the vehicle and the proposed position.

This provides the advantage that confusion between the real world and the virtual object is avoided.

In some embodiments the control means is configured to: prevent the display of the virtual object in dependence on a determination that an obstruction is at the proposed position or between the vehicle and the proposed position.

This provides the advantage that the user is not presented with a view of the virtual object being superimposed over another real-world object and therefore the user has a clearer view of the obstruction. For example, where the obstruction is a vehicle and the virtual object provides a view of a vehicle, the user is not presented with a confusing view of a simulated vehicle being superimposed over a real vehicle.

In some embodiments the control means is configured to display an alternative graphical element to the virtual object in dependence on a determination that an obstruction is at the proposed position or between the vehicle and the proposed position.

This provides the advantage that the user may still be provided with information, such as navigational information, even when the usual virtual object is not displayed.

In some embodiments the alternative graphical element comprises an indication of a direction of the route for the vehicle.

In some embodiments the control means is configured to determine the proposed position and the proposed orientation for a 3-dimensional object and to generate the image data for displaying the virtual object from a 3-dimensional model of the 3-dimensional object in dependence on at least one of: the positional data; the current orientation of the vehicle; and the proposed orientation.

In some embodiments the control means is configured to determine a proposed position and proposed orientation for the 3-dimensional object and to generate the image data for displaying the virtual object from a 3-dimensional model of the 3-dimensional object in dependence on the positional data, the current orientation of the vehicle and the proposed orientation.

This provides the advantage that the user may be presented with views of the 3-dimensional object which are like those expected of a real 3-dimensional object present in the exterior environment.

In some embodiments the virtual object comprises a 2-dimensional virtual object.

In some embodiments the control means is configured to display an alternative graphical element in dependence on the proposed position being outside of a limit of the head-up display in which the virtual object is not present in a field of view of the head-up display.

This provides the advantage that when the head-up display has a limited field of view, so that it cannot display the virtual object in all required positions, it is still able to provide information to the user by displaying the alternative graphical element.

In some embodiments the alternative graphical element provides an indication of the direction of a route for the vehicle.

This provides the advantage that the user may still be provided with essential navigational information, even when the head-up display cannot display the usual virtual object due to its limited field of view.

In some embodiments the control means is configured to: determine, from the environment data, positions along a route where it is necessary to change direction or to turn onto a different road or to change of lane on a road while the vehicle is driven; and generate image data to cause an indication on the head-up display to provide a warning that a change in direction or a turn onto a different road or a change of lane is about to be required.

In some embodiments the virtual object is a representation of a vehicle, and the indication on the head-up display comprises flashing direction indicators (or turn signals).

In some embodiments the control means is configured to receive environment data from at least one of: a satellite navigation module comprising a digitally stored map; one or more distance sensors; a radar system, a lidar system, and a camera. In some embodiments the one or more distance sensors are ultrasonic sensors. In some embodiments the ultrasonic sensors are configured to function as parking sensors and/or Autonomous Emergency Braking (AEB) sensors. In some embodiments the camera comprises a stereo camera. In some embodiments the camera comprises a mono camera.

In some embodiments the control means is configured to determine the current position and/or the current orientation of the vehicle from data obtained from a satellite navigation device.

In some embodiments the control means is configured to determine the current position and/or the current orientation from data obtained from one or more of: an inertial measurement unit (IMU), an accelerometer; a gyroscope and an odometer.

In some embodiments the control means comprises an electronic processor and a electronic memory device coupled to the electronic processor and having instructions stored therein.

According to another aspect of the invention there is provided a system comprising a head-up display and the apparatus of any one the previous paragraphs, wherein the apparatus is configured to provide an output signal to the head-up display to cause the head-up display to display the virtual object.

In some embodiments the system comprises an imaging means configured to capture an image containing a representation of an eye of a user of the vehicle, and processing means configured to generate the positional data in dependence on the captured image.

According to further aspect of the invention there is provided a vehicle comprising the system of any one of the previous paragraphs or the apparatus of any one of the previous paragraphs.

According to yet another aspect of the invention there is provided a method of controlling a head-up display of a vehicle, the method comprising: obtaining positional data representative of a position of an eye of a user of the vehicle; obtaining environment data representative of the environment external to the vehicle; obtaining status data representative of a current position of the vehicle; determining a proposed position and proposed orientation in dependence on the environment data and the status data; and in dependence on the proposed position, the proposed orientation and the positional data, generating image data for the head-up display for causing the head-up display to display a virtual object so as to appear at the proposed position and with the proposed orientation with respect to the environment.

This provides the advantage that the virtual object appears to be correctly positioned and oriented within the environment external to the vehicle even when the user moves his or her head. Also the virtual object may be animated in a way that is naturalistic and therefore conveys information to the user without causing a distraction.

In some embodiments, the status data is representative of a current orientation of the vehicle and the method comprises generating the image data in dependence on the current orientation of the vehicle.

In some embodiments the environment data comprises route data representative of a route for the vehicle, the proposed position is on the route and the proposed orientation is indicative of a direction along the route.

In some embodiments the method comprises: obtaining speed data representative of a current speed of the vehicle; and determining the proposed position and proposed orientation in dependence on the environment data, the current position of the vehicle and the current speed of the vehicle.

In some embodiments the method comprises adjusting the apparent distance between the vehicle and the virtual object.

In some embodiments the method comprises: determining from the environment data a proposed speed for the vehicle at the proposed position; and decreasing the apparent distance between the vehicle and the virtual object in dependence on the current vehicle speed being greater than the proposed speed.

In some embodiments the method comprises decreasing the apparent distance between the vehicle and the virtual object in dependence on the environment data being indicative of the vehicle approaching a section of the road/route having at least one of: a legal speed limit which is less than the current speed of the vehicle; a bend; a road junction; and traffic moving slower than the vehicle.

In some embodiments the method comprises: determining from the environment data a proposed speed for the vehicle at the proposed position; and increasing the apparent distance between the vehicle and the virtual object in dependence on the current speed of the vehicle being less than the proposed speed.

In some embodiments the method comprises: adjusting or reducing a brightness of the virtual object in dependence on a determination that an obstruction is at the proposed position.

In some embodiments the method comprises: preventing the display of the virtual object in dependence on a determination that an obstruction is at the proposed position or between the vehicle and the proposed position.

In some embodiments the method comprises displaying an alternative graphical element to the virtual object in dependence on a determination that an obstruction is at the proposed position or between the vehicle and the proposed position.

In some embodiments the alternative graphical element comprises an indication of a direction of the route for the vehicle.

In some embodiments the method comprises determining a proposed position and a proposed orientation for a 3-dimensional object and generating the image data for displaying the virtual object from a 3-dimensional model of the 3-dimensional object in dependence on the positional data, the current orientation of the vehicle and the proposed orientation.

In some embodiments the virtual object comprises a 2-dimensional virtual object.

In some embodiments the method comprises displaying an alternative graphical element in dependence on the proposed position being outside of a limit of the head-up display in which the virtual object is not present in a field of view of the head-up display.

In some embodiments the alternative graphical element provides an indication of the direction of a route for the vehicle.

In some embodiments the method comprises: determining, from the environment data, positions along a route where it is necessary to turn onto a different road or to change of lane on a road; and generating image data to cause an indication on the head-up display to provide a warning that a turn onto a different road or a change of lane are about to be required.

In some embodiments the method comprises receiving environment data from at least one of: a satellite navigation module comprising a digitally stored map; one or more distance sensors; a radar system, a lidar system, and a camera.

In some embodiments the method comprises determining the current position and/or the current orientation of the vehicle from data obtained from a satellite navigation device.

In some embodiments the method comprises determining the current position and/or the current orientation from data obtained from one or more of: an inertial measurement unit (IMU), an accelerometer; a gyroscope and an odometer.

In some embodiments the method comprises providing an output signal to the head-up display to cause the head-up display to display the virtual object.

In some embodiments the method comprises capturing an image containing a representation of an eye of a user of the vehicle, and generating the positional data in dependence on the captured image.

The virtual object may be a representation of a vehicle, and the vehicle brake lights in the representation may be selectively illuminated to provide an indication to a user that a reduction in speed is required. The vehicle direction indicators (or turn signals) in the representation of the vehicle, may be selectively illuminated to provide a warning that a change in direction or a turn onto a different road or a change of lane is about to be required.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
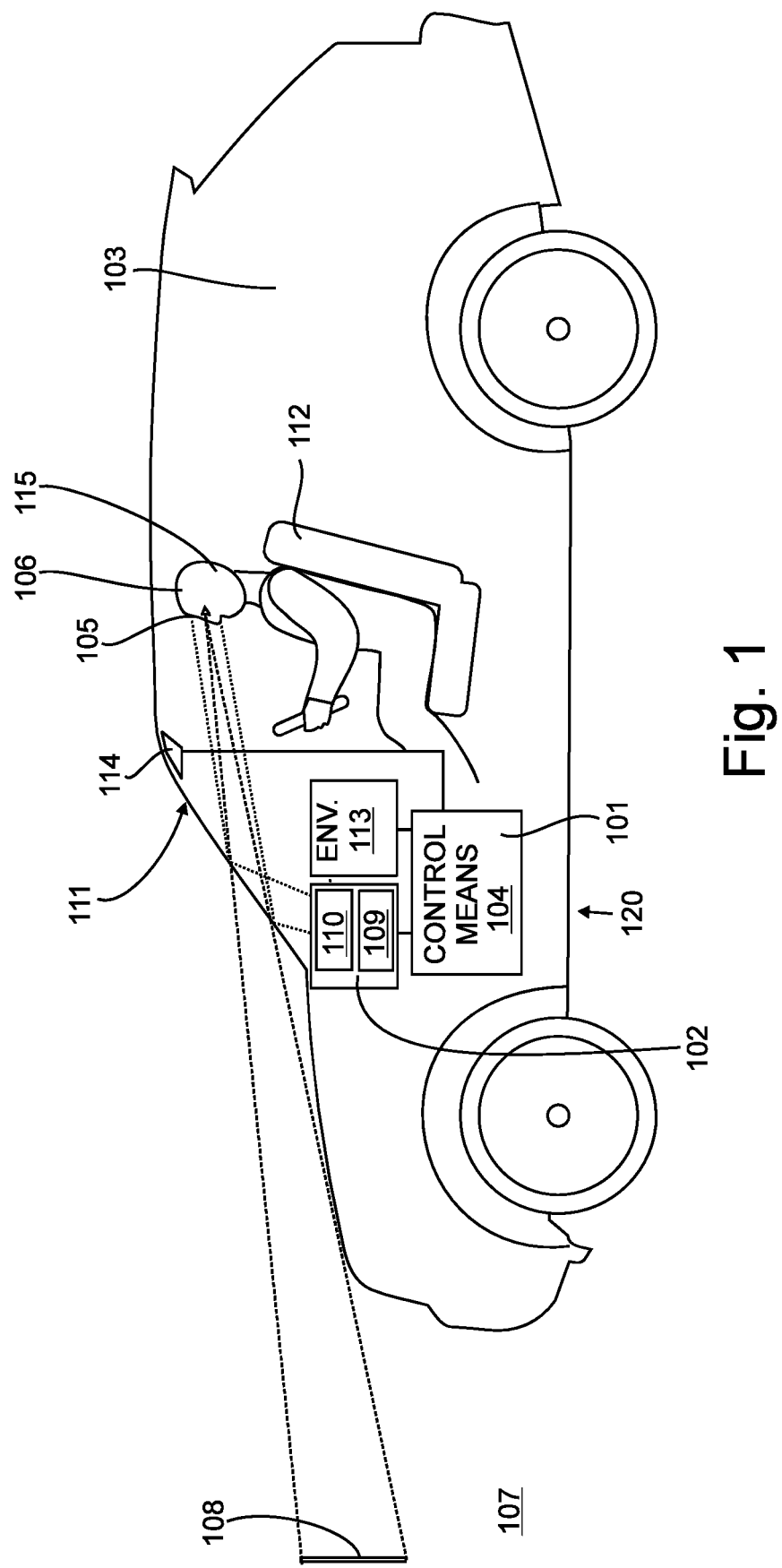
FIG. 1 illustrates a vehicle comprising an embodiment of an apparatus in accordance with the invention.

The Figures illustrate an apparatus 101 for controlling a head-up display 102 of a vehicle 103, the apparatus 101 comprising control means 104 configured to: obtain positional data representative of a position of at least one eye 105 of a user 106 of the vehicle; obtain environment data representative of the environment 107 external to the vehicle 103; obtain status data representative of a current position of the vehicle 103; determine a proposed position and proposed orientation for an object in dependence on the environment data and the current position of the vehicle 103; and in dependence on the proposed position, the proposed orientation and the positional data, generate image data for the head-up display 102 for causing the head-up display 102 to display a virtual object 108 so as to appear at the proposed position and with the proposed orientation with respect to the environment.

In the illustrated embodiments, the status data is also representative of a current orientation of the vehicle and the control means is configured to generate image data in dependence on the current orientation of the vehicle.

FIG. 1 illustrates the vehicle 103 comprising a head-up display system 120 and the apparatus 101. The head-up display system 120 comprises the head-up display 102. The apparatus 101 comprises a control means 104 for causing the head up display to display the virtual object 108. The head-up display 102 comprises an image display device 109 and an optical system 110 configured to project light from the image display device onto a windshield 111 of the vehicle 103, where it is reflected towards the eyes 105 of a user 106 of the vehicle 103. Thus, in the illustrated embodiment, the windshield 111 is configured to provide the function of a combiner of the head-up display 102.

In the illustrated embodiment, the head-up display 102 is arranged to project light towards the eyes of a user 106 seated in a driver's seat 112 of the vehicle 103. However, it is envisaged that the head-up display 102 may be arranged to project light towards the eyes of a user seated in any seat of the vehicle 103, such as a front or rear passenger seat, for example.

The optical system 110 is configured to produce the virtual object 108 which appears to the user 106 as a virtual object 108 positioned in front of the vehicle 103 and within the exterior environment 107 ahead of the vehicle 103. The image displayed by the head up display 102 is controlled by the control means 104 in dependence of data it obtains from environment sensing means 113 located within the vehicle 103 and positional data it obtains from images captured by imaging means 114, also located within the vehicle 103.

The environment sensing means 113 comprises means for determining the position and orientation of the vehicle 103 within the environment 107 to provide status data representative of the current position and current orientation of the vehicle 103 to the control means 104. The environment sensing means 113 also comprises means for determining features of the environment 107 external to the vehicle 103 as is described below with reference to FIG. 7.

The imaging means 114 comprises one or more cameras configured to capture images of the user's head 115 which include a representation of one or more eyes 105 of the user 106. The captured images are analysed to determine where in the image at least one of the eyes 105 are positioned. This process may be performed by a processor within the one or more cameras forming the imaging means 114 or may be performed by another processor of the apparatus 101. After determining the position of the representation of the user's eyes 105 within an image this information is processed to determine positional data representative of a position within the vehicle 103 of at least one eye 105 of the user 106.

Figure 2:
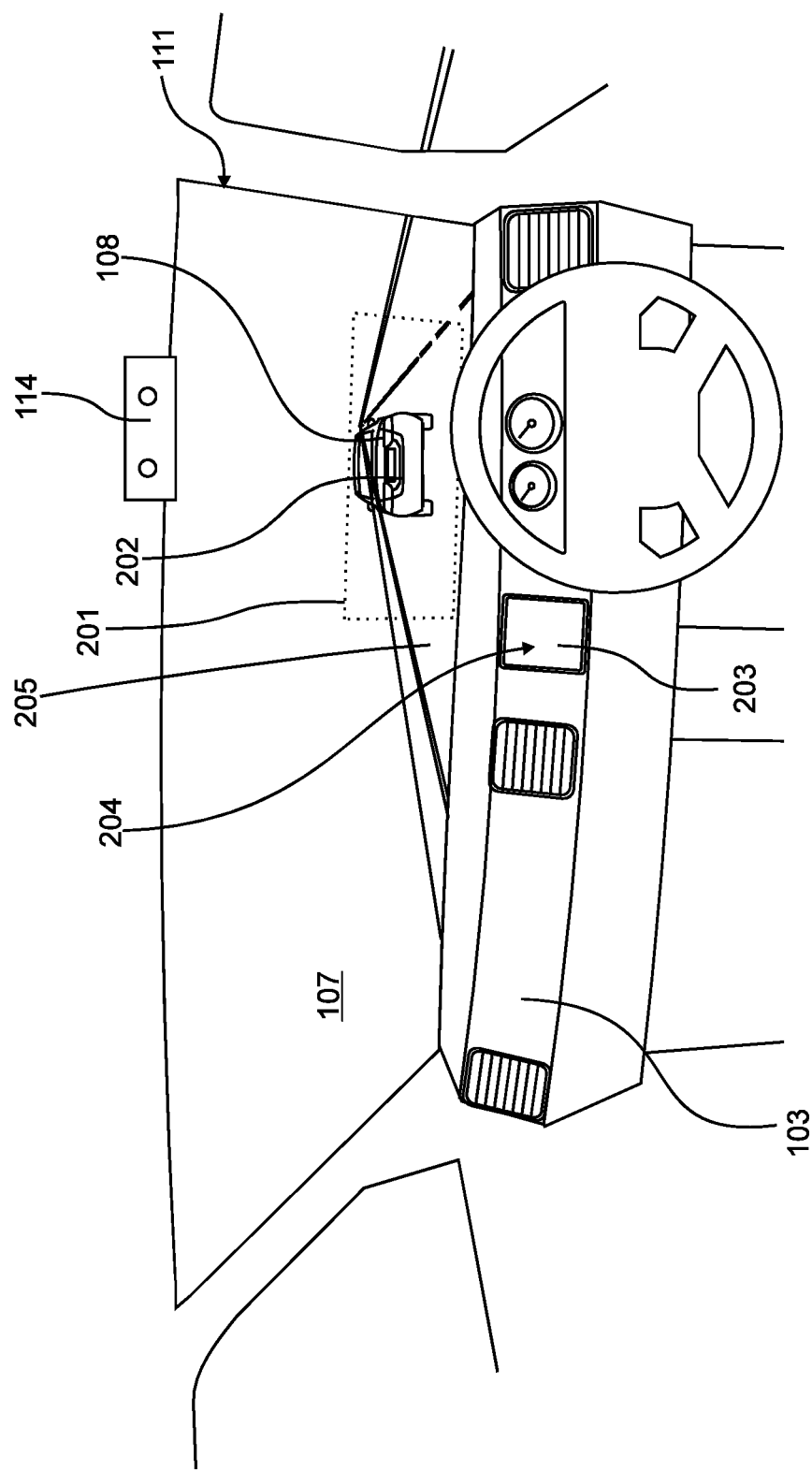
FIG. 2 is a first perspective view from a seat of the vehicle shown in FIG. 1 illustrating an operational use of the apparatus.

A view from a seat 112 through the windshield 111 of the vehicle 103 is shown in FIG. 2. The head-up display 102 (shown in FIG. 1) presents images to a user within a field of view 201 (represented by a rectangular dotted outline). In the illustrated embodiment, the head-up display 102 presents a virtual object 108 which illustrates a view of a 3-dimensional object 202 to the user 106 (shown in FIG. 1), so that the object 202 appears to be within the exterior environment 107 on a route being taken by the vehicle 103. In the illustrated embodiment, the object 202 has the appearance of a vehicle in the form of a car 202.

The vehicle 103 comprises a navigation device 203 with a user interface 204 to enable a user of the vehicle 103 to enter details of a route or a destination for the vehicle 103. The navigation device 203 may comprise a satellite navigation device comprising a receiver for receiving signals in a global navigation satellite system (GNSS) such as a Global Positioning System (GPS). The navigation device 203 may also comprise data storage means, such as a flash memory device, storing one or more maps in a digital form, and a route planner configured to determine a route in dependence of the current position of the vehicle 103 and a user selected destination.

Under the control of the control means 104 (shown in FIG. 1) the head-up display 102 is arranged to display the car 202 such that it appears to a user of the vehicle 103 as if it were a real car driving along the route determined by the navigation device 203 of the vehicle 103. As shown in FIG. 2, the head-up display 102 is arranged to display the car 202 such that it has an apparent position which is ahead of the vehicle 103. Consequently, the user 106 (shown in FIG. 1) of the vehicle 103 is able to follow the displayed car 202 as if it were a real car driving on the user's intended route.

To ensure that the displayed car 202 appears to the user 106 to be correctly positioned and oriented with respect to the exterior environment 107, the head-up display system 120 (shown in FIG. 1) includes the imaging means 114 and references the positional data obtained from the imaging means 114 to enable positioning data indicative of the position of the user's eyes 105 to be determined. Thus, when the user 106 moves their eye position, the displayed car 202 does not appear to move from its correct position and orientation in the environment 107. For example, in FIG. 2, the displayed car 202 appears to the user 106 as being on a road surface 205 and pointing in a direction in which it appears to be travelling.

In the example of FIG. 2, the vehicle 103 is travelling at a speed typical of highway driving and the displayed car 202 has the appearance of a car 202 that is about 8 metres ahead of the vehicle 103. Other distances between the vehicle 103 and the apparent position of the car 202 are envisaged.

The head-up display system 120 (shown FIG. 1) is configured to provide warnings to the user 106 of changes in speed and direction that will or may be required for the vehicle 103 to travel on a determined route. For example, when the environment sensing means 113 provides data indicative of a feature or features of the environment ahead that require a reduction in speed when compared to the current speed of the vehicle 103, the control means 104 is arranged to cause the head-up display 102 to provide an indication of the required reduction in speed. The control means 104 may do this by providing an immediate visual indication, such as causing brake lights on the displayed car 202 to be illuminated. In addition, the control means 104 causes the dimensions of the displayed car 202 to increase so that it appears to the user 106 that the displayed car 202 is getting closer to the vehicle 103 due to braking.

Similarly, when the environment sensing means 113 provides data indicative of a feature or features of the environment ahead that allow an increase in speed when compared to the current speed of the vehicle 103, the control means 104 is arranged to cause the head-up display 102 to provide an indication of the increase in speed. The control means 104 may do this by providing causing the dimensions of the displayed car 202 to decrease so that it appears to the user 106 that the displayed car 202 is getting further from the vehicle 103 due to acceleration.

In the illustrated embodiment, the head-up display 102 is configured to enable the presentation of the virtual object 108 at apparently varying distances in front of the vehicle 103. The varied distances to the virtual object 108 may be achieved by moving the virtual image generated by the head-up display 102 in a road perspective-oriented plane of the head-up display 102. For example, in an embodiment the head-up display 102 is a "tilted-plane" head-up display, in which the virtual object appears to the user to be located on a plane that is tilted to the vertical.

Figure 15:
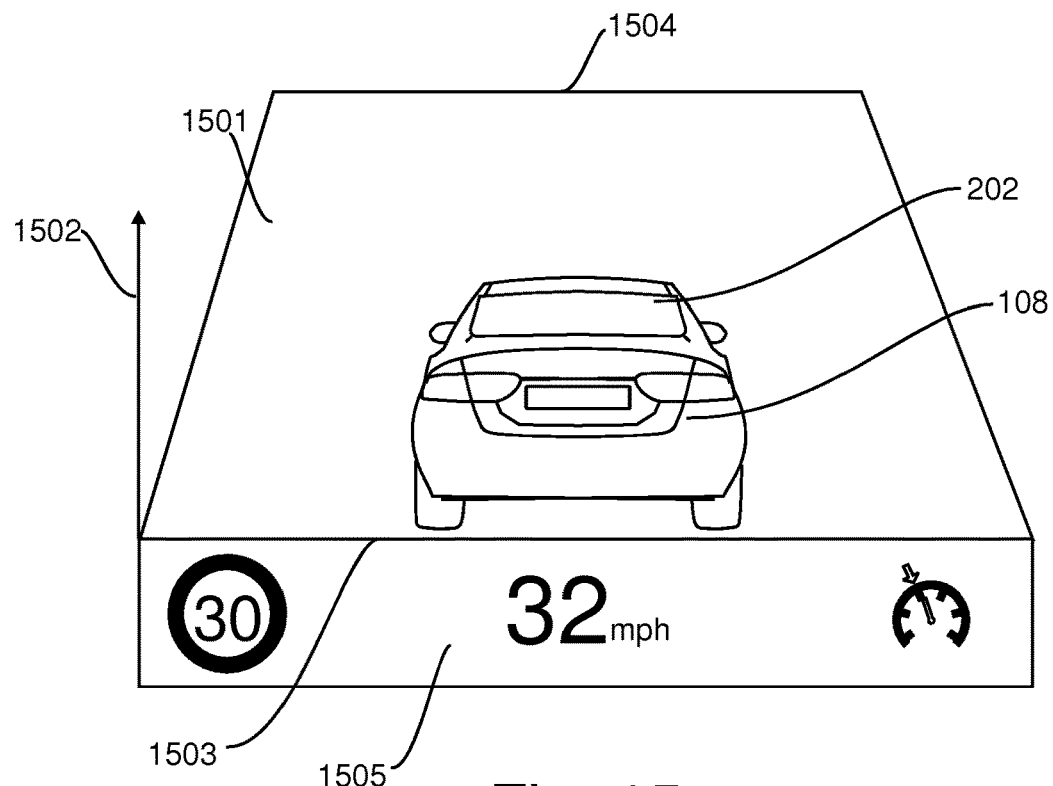
FIG. 15 illustrates a user's view of a virtual object, which is displayed on a tilted plane, in accordance with an embodiment of the invention.
Figure 16:
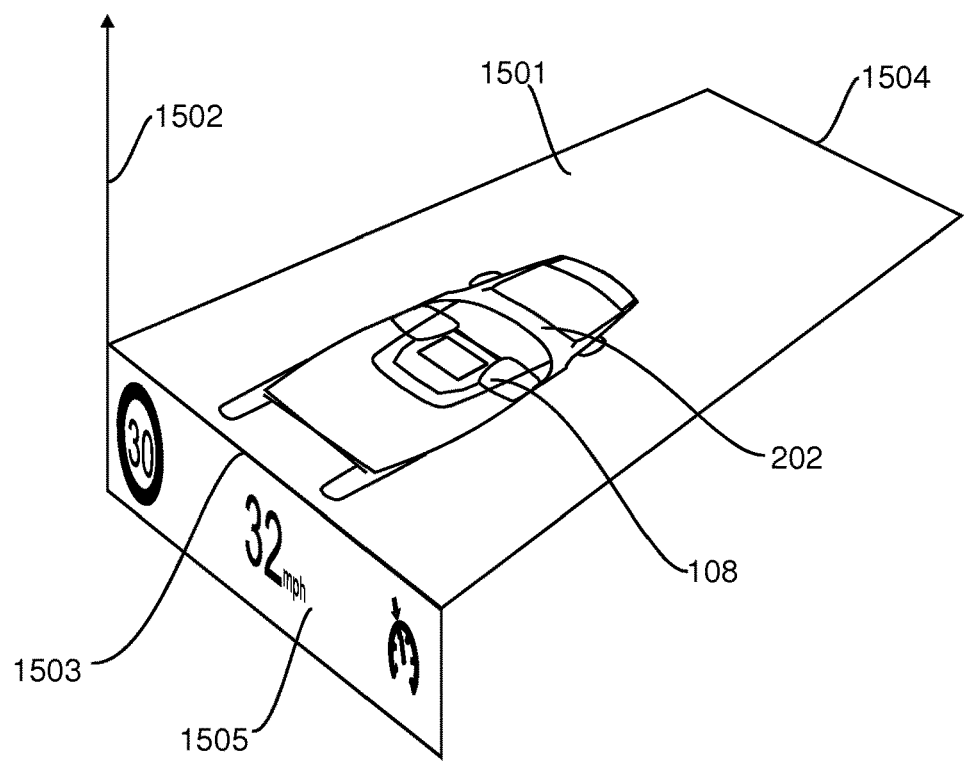
FIG. 16 illustrates a different view of the virtual object displayed on the tilted plane shown in FIG. 15.

An example of a virtual object 108, in the form of the car 202, displayed so that it appears on a tilted plane 1501 is shown in a first view from a position of a user in FIG. 15. FIG. 16 illustrates the orientation of the tilted plane 1501 relative to a direction, which is represented by an arrow 1502 and which is substantially perpendicular to a road surface on which the vehicle (103 in FIG. 1) is located. In the embodiment illustrated in FIGS. 15 and 16, additional graphical elements relating to the speed of the vehicle (103 shown in FIG. 1) are displayed on a second plane 1505 which is substantially parallel to the arrow 1502.

The tilted plane 1501 is positioned so that a first edge 1503, which is nearest to the user (106 shown in FIG. 1), is at a first height and the height of the tilted plane 1501 increases as the distance from the first edge 1503 increases, up to a second edge 1504, which is furthest from the user. Thus, the virtual object 108 can be moved away from the first edge 1503 towards the second edge 1504, resulting in the virtual object appearing to move away from the user 106, or the virtual object 108 can be moved towards the first edge 1503 away the second edge 1504, resulting in the virtual object appearing to move towards the user 106. While the virtual object 108 is moved in this way, it is scaled in a corresponding manner i.e., the dimensions of the virtual object 108 are reduced as it is moved away from the first edge 1503 and increased as it is moved towards the first edge 1503. By varying the apparent distance of the virtual object 108 and altering its size in a corresponding manner, a depth to the display is conveyed to the user 106.

Therefore, to enhance the appearance of the displayed car 202 getting closer due to braking, the head-up display 102 is also caused to reduce the apparent distance to the virtual object 108. Similarly to enhance the appearance of the displayed car 202 getting further away due to accelerating, the head-up display 102 is caused to increase the apparent distance to the virtual object 108. In an embodiment, the head-up display is configured to enable the presentation of the virtual object 108 at an apparent distance ranging from about 2 metres to about 8 metres. However, other embodiments are envisaged in which the apparent distance is varied between limits other than 2 metres and 8 metres. Adjusting these limits may be appropriate in dependence on the vehicle and the height of the user's eyes above the ground, for example, increasing the limits for a tall statured vehicle with a correspondingly high driving position and decreasing them for a vehicle with a very low seating position.

Figure 3:
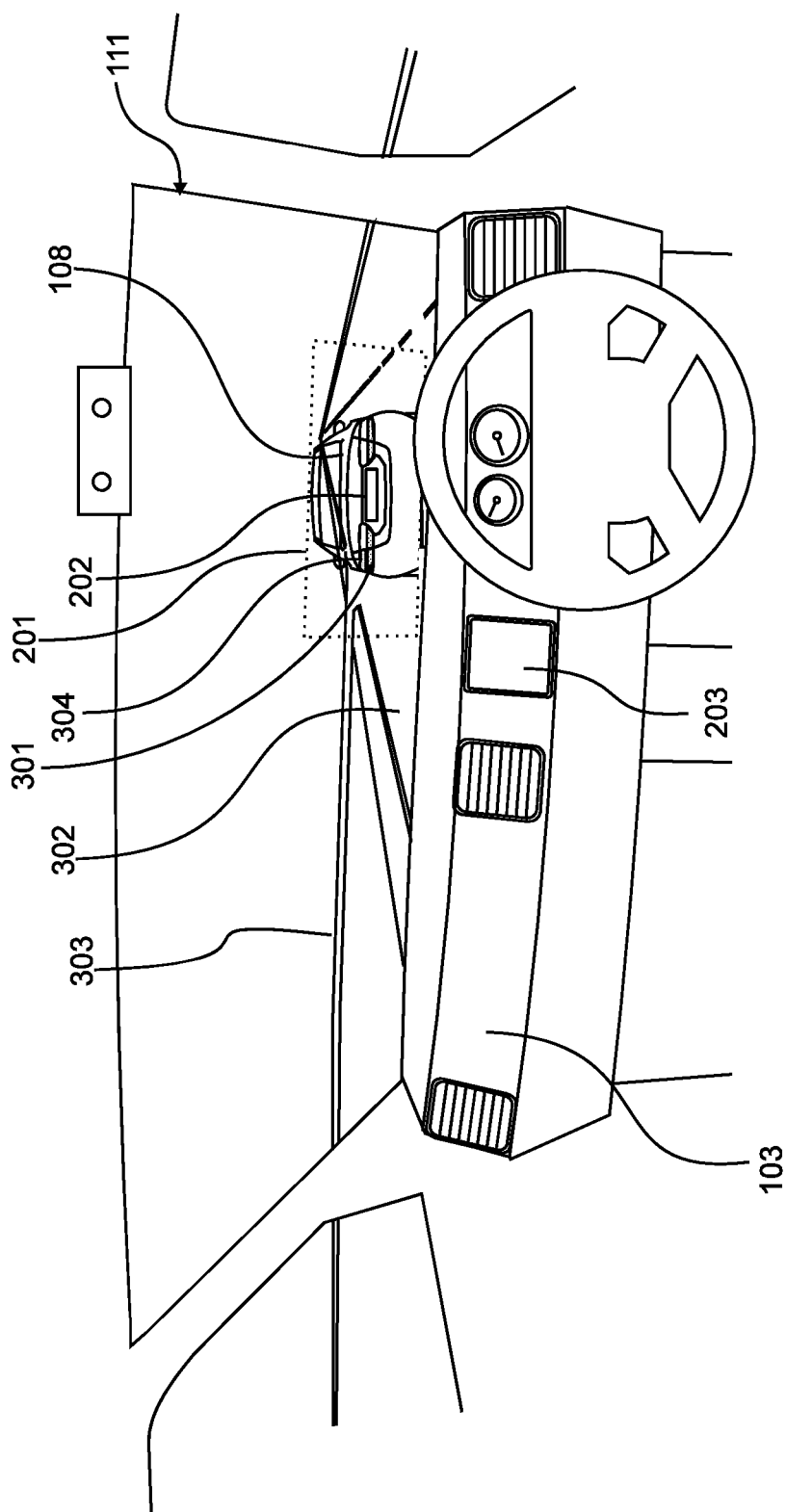
FIG. 3 is a second perspective view from a seat of the vehicle shown in FIG. 1 illustrating an operational use of the apparatus.

A second example of a view through the windshield 111 of the vehicle 103 is shown in FIG. 3. Specifically, FIG. 3 shows a view at a time when the environment sensing means 113 has detected that a feature or features of the environment ahead require a reduction in speed of the vehicle 103. Consequently, the head-up display 102 displays the car 202 with illuminated brake lights 301, and the car appears to be larger and closer, due to it braking. By illuminating the brake lights 301 and providing the appearance of the displayed car 202 starting to slow down, the head-up display system 120 warns the user 106 that, at the apparent position of the displayed car 202, he or she will also have to brake.

In the example shown in FIG. 3, the need for braking has arisen due to an upcoming turn from the current road 302 onto a side road 303. Consequently, under the control of the control means 104, the head-up display 102 has also been caused to start displaying a flashing indicator light (or turn signal) 304 on the displayed car 202 when the displayed car 202 appears to be within a suitable distance of the turn. Therefore, the user 106 of the vehicle 103 is warned of the need to turn onto the side road 303 and also prompted to indicate their intention to turn, to other road users, at the position where the displayed car 202 started indicating.

Figure 4:
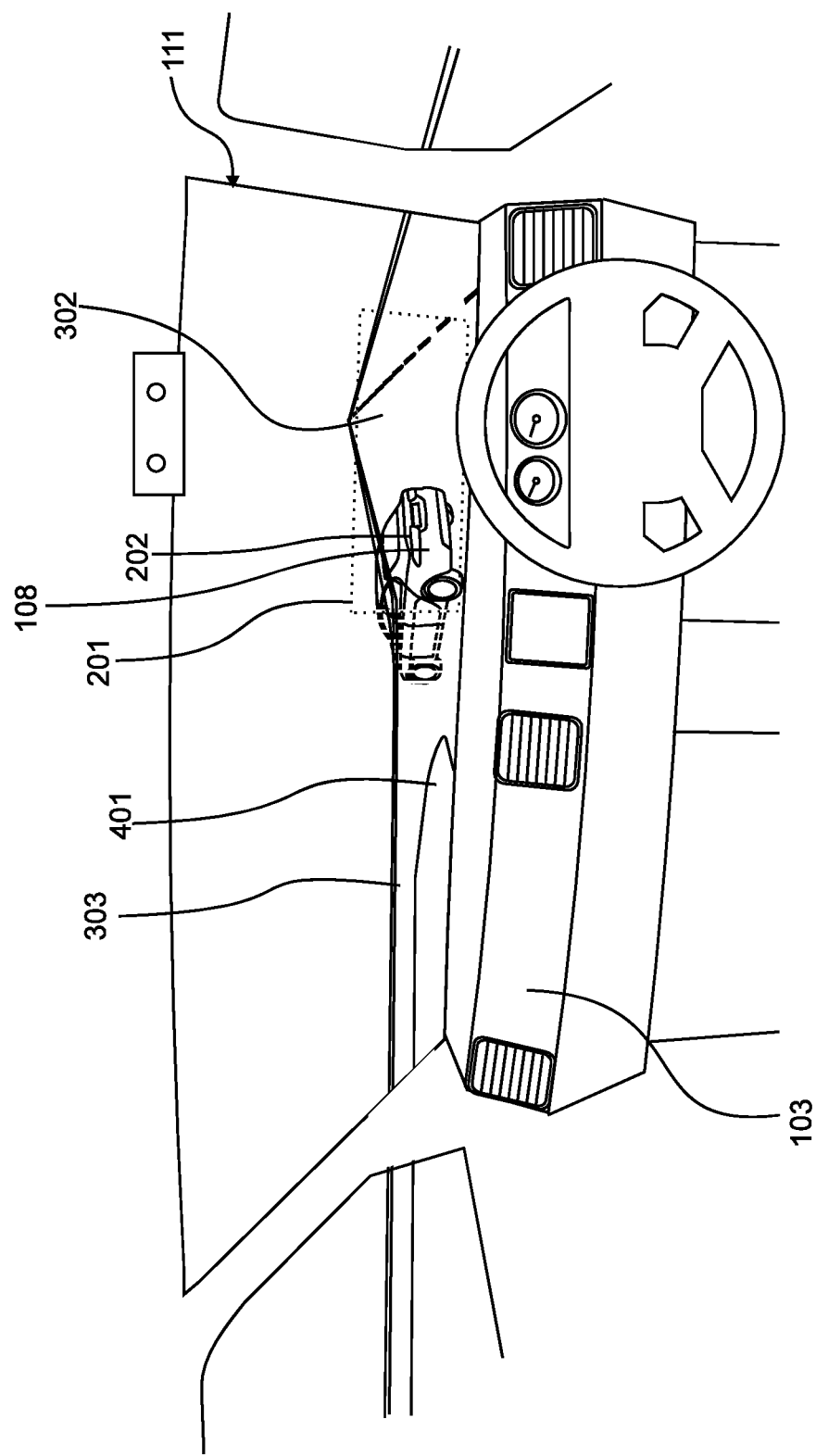
FIG. 4 is a third perspective view from a seat of the vehicle shown in FIG. 1 illustrating an operational use of the apparatus.

A third example of a view through the windshield 111 of the vehicle 103 is shown in FIG. 4. Specifically, FIG. 4 shows a view at a time when the vehicle 106 is approaching a junction where the side road 303 meets the main road 302. In this instance, the car 202 is displayed, at a position and orientation, as if it is travelling around a bend 401 from the main road 302 onto the side road 303, in the manner of a real car.

To achieve this, the control means 104 (shown in FIG. 1) is configured to determine a proposed position and proposed orientation for the displayed car 202 in dependence on environment data obtained from the environment sensing means 113. The environment data includes data defining: the location and configuration of the junction; the route, which in this case extends from the main road 302 onto the side road 303; and the current position of the vehicle 103. The proposed position of the displayed car 202 is shown in FIG. 4. However, the proposed position of the front of the car 202 is outside of the field of view 201 and consequently only a rear portion of the car 202 is displayed on the head-up display 102.

In the present embodiment, to simulate the movements of a real car by the displayed car 202, the control means 104 is configured to determine a proposed position and proposed orientation for a 3-dimensional model of the car 202 and to generate the image data for the virtual object 108 from the 3-dimensional model. In the present embodiment, the head-up display 102 is configured to present a 2-dimensional virtual object 108 to the user 106, but the image data is determined from the 3-dimensional model of the car 202, and therefore the user 106 is presented with views of the displayed car 202 as if it were a 3-dimensional object located within the environment external to the vehicle 103.

Figure 5:
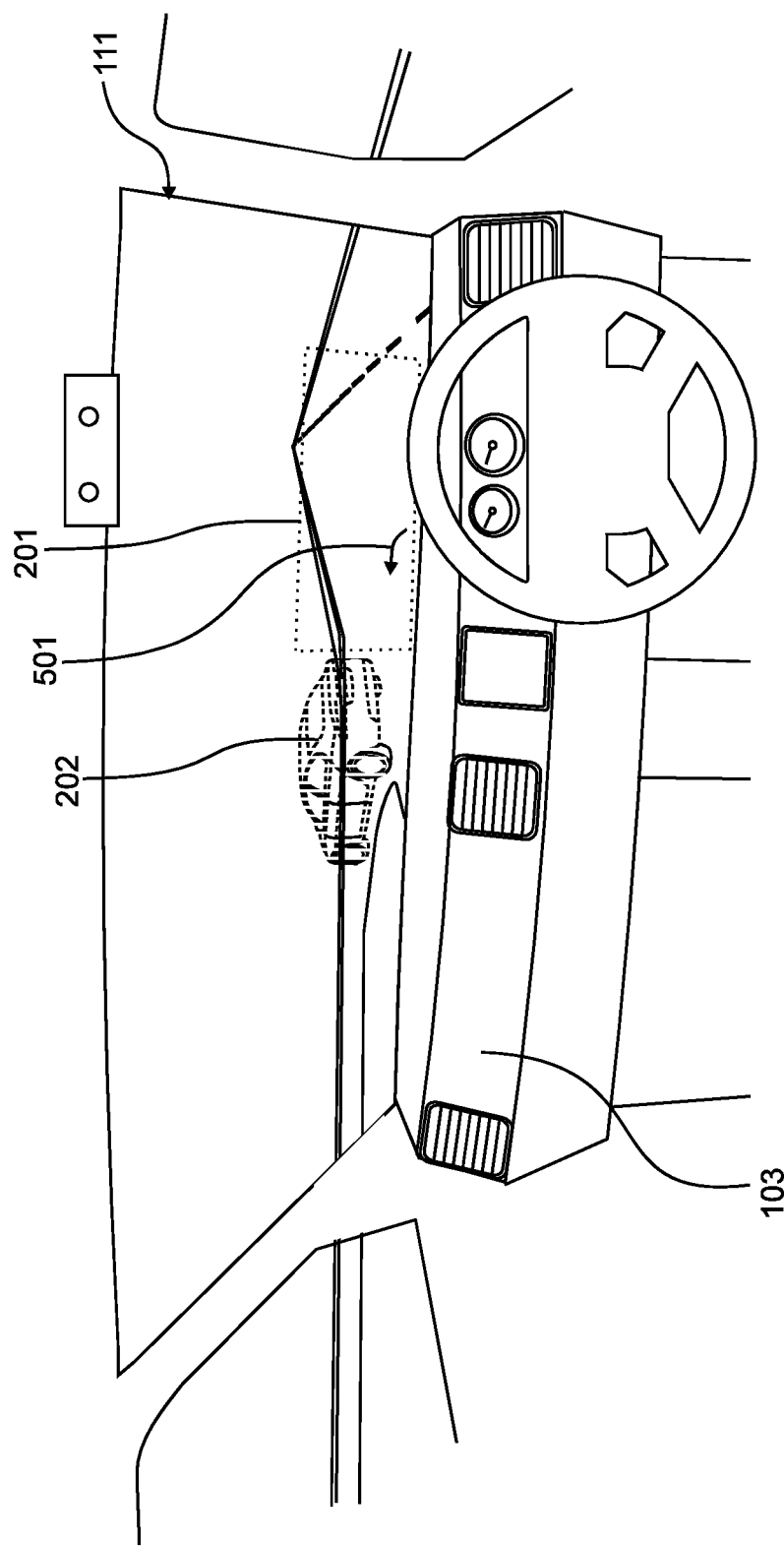
FIG. 5 is a fourth perspective view from a seat of the vehicle shown in FIG. 1 illustrating an operational use of the apparatus.

A fourth example of a view through the windshield 111 of the vehicle 103 is shown in FIG. 5. Specifically, FIG. 5 shows a view at a time when the vehicle 103 has almost reached the junction where the side road 303 meets the main road 302. In this instance, the proposed position of the car 202 is such that the region in which the car 202 should be displayed is completely outside of a limit of the head-up display 102 (shown in FIG. 1), i.e. the proposed position of the car 202 is no longer within the field of view 201 of the head-up display. However, to ensure that the user 106 is kept informed of the correct route, in dependence on the car 202 not being displayed, the control means 104 (shown in FIG. 1) is configured to cause the head-up display 102 to display an alternative graphical element in the form of an arrow 501 to indicate that the user should turn at the junction.

Figure 6:
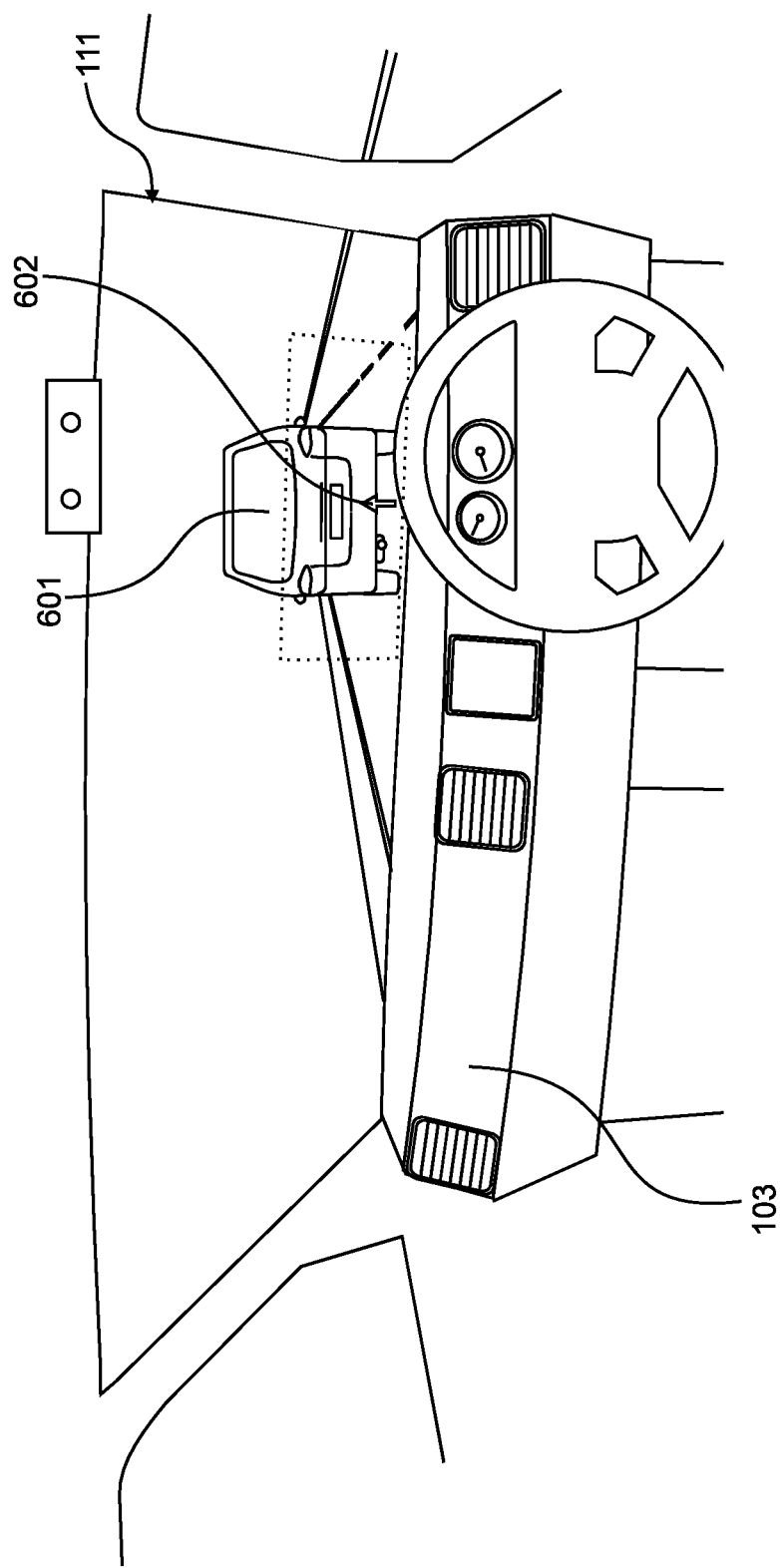
FIG. 6 is a fifth perspective view from a seat of the vehicle shown in FIG. 1 illustrating an operational use of the apparatus.

A fifth example of a view through the windshield 111 of the vehicle 103 is shown in FIG. 6. Specifically, FIG. 6. shows a view at a moment when an obstruction, in the form of another vehicle 601, is at a proposed position for the car 202 or is between the position of the vehicle 103 and the proposed position for the car 202. The control means 104 may be configured to change the appearance of the virtual object 108 in dependence on a determination that an obstruction 601 is at the proposed position, or between the vehicle 103 and the proposed position. For example, the brightness of the virtual object 108 may be adjusted, for example reduced, in such circumstances. Additionally, or alternatively, the colour of the virtual object may be altered and/or the virtual object may be changed to an alternative graphic. In the present embodiment, the brightness of the virtual object 108 is arranged to be reduced to zero, to prevent the display of the virtual object.

This typically may happen when the vehicle 103 slows down or stops when approaching a junction. However, in the present embodiment the control means 104 is configured to cause the display of an alternative graphical element 602 instead of the vehicle 202 as the virtual object in dependence on a determination that an obstruction is at the proposed position, or between the vehicle 103 and the proposed position. Thus, for example, the control means 104 may be configured to cause an arrow 602 to be displayed, to indicate the proposed route to the user 106, in the absence of the car 202 being displayed. In the example shown in FIG. 6, an upward pointing arrow 602 is being displayed to indicate to the user 106 that the proposed route is straight on.

In the examples shown in FIGS. 2 to 6, the virtual object 108 is a representation of a car 202, but it will e appreciated that the virtual object 108 could take the appearance of a different type of vehicle in alternative embodiments. Alternatively, the virtual object 108 could have the appearance of an object other than a vehicle.

Figure 7:
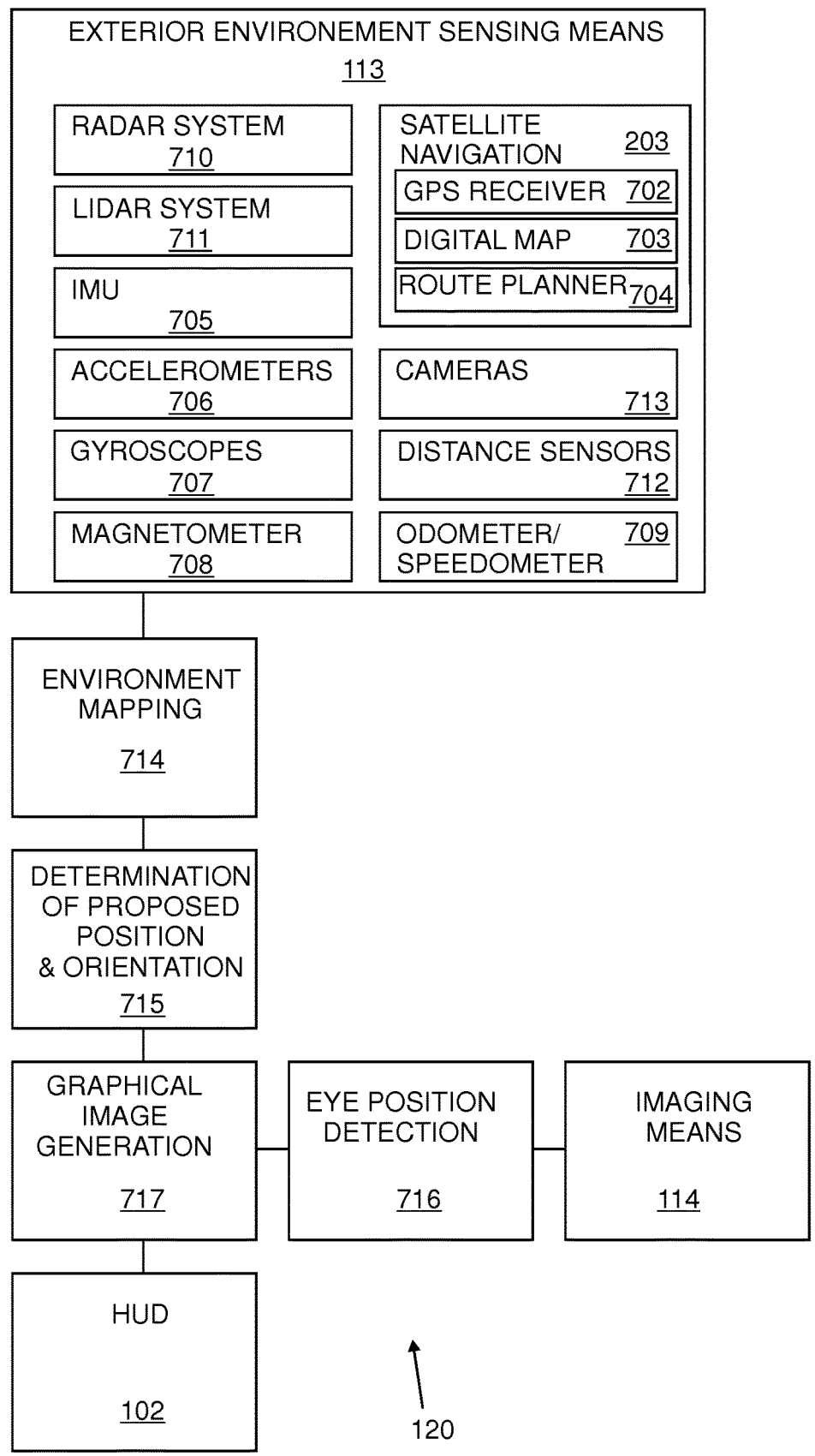
FIG. 7 is a block diagram illustrating an embodiment of a head up display system in accordance with the invention.

A block diagram illustrating functional components of an embodiment of the head up display system 120 is shown in FIG. 7. The system 120 comprises environment sensing means 113 configured to determine the position and orientation of the vehicle 103 within the environment 107 and to determine one or more features and/or obstructions of the environment 107 or on a proposed route for the vehicle 103. The environment sensing means 113 comprises a satellite navigation module 203 which comprises a global navigation satellite system (GNSS) in the form of a Global Positioning System (GPS) receiver 702, stored digital maps 703 and a route planner 704 configured to determine a route in dependence of the current position of the vehicle 103 and a user selected destination.

To enhance data produced by the satellite navigation module 203, and to replace that data when necessary, the environment sensing means 113 additionally comprises an odometer or speedometer 709; and an accelerometer 706, a gyroscope 707 and a magnetometer 708 which may form part of an inertial measurement unit (IMU) 705. In addition, the environment sensing means 113 comprises one or more systems for sensing one or more features of the environment in the vicinity of the vehicle 103, including a radar system 710 and a lidar system 711 that senses the environment by detection of reflected laser light. Distance sensors 712, such as those used for parking, or cameras 713 may be used to detect nearby obstructions, such as a vehicle in the route ahead of the vehicle 103.

The cameras 713 and/or the lidar system 711 may form a part of an advanced user assistance system or advanced driver assistance system (ADAS), as is known in the art.

An environment mapping means 714 determines the position and orientation of the vehicle 103 in dependence on data received from the environment sensing means 113. For example, the position and orientation of the vehicle 103 may be determined from the satellite navigation system 203 and knowledge of the path of the vehicle 103 along the proposed route as determined by the route planner 704. The environment mapping means 714 may be configured to perform data fusion algorithms which process the data from the various sources provided by the environment sensing means 113. For example, the position and orientation of the vehicle 103 determined from the satellite navigation system 203 may be enhanced by dead reckoning calculations performed in dependence on data received from the odometer or speedometer 709 and the IMU 705 or accelerometers 706, gyroscopes 707 and magnetometer 708.

Dead reckoning may be performed to determine the position of the vehicle 103 when GPS signals are unavailable, such as when the vehicle 103 is within a tunnel or between very tall buildings. However, dead reckoning may also be used to enhance the accuracy of the position determination from GPS signals. Likewise, the accuracy of the dead reckoning may be improved by comparing positions determined from dead reckoning with positions determined from the GPS signals, when GPS signals are available.

The position and orientation determination may also be enhanced by a high definition map that includes landmarks that may be compared with data received from the radar system 710 or lidar system 711. The high definition map may also include information relating to maximum speed limits and potential hazards such as road junctions that may require a reduction in speed.

The environment mapping means 714 may also be arranged to obtain details of the route immediately ahead of the vehicle 103, including details of bends in the roads, and changes in elevation of the road. Such details may be obtained from high definition maps, which contain altitude data, and/or from a lidar system 711 and/or a radar system 710.

The environment mapping means 714 provides data to a processing means 715 for the determination of a proposed position and orientation of the virtual object 108 to be displayed. The data received by the processing means 715 may comprise the determined position and orientation of the vehicle 103, the current speed of the vehicle 103 and data indicative of the next portion of the route that the vehicle 103 is about to negotiate, including changes in direction and elevation, and a maximum or suitable speed for the next portion of the route. The processing means 715 is configured to determine a proposed position and orientation of the virtual object 108 in dependence on the determined position and orientation of the vehicle 103, the data indicative of the next portion of the route and a previous proposed position and orientation of the virtual object 108.

It will be appreciated that the process performed by processing means 715 is one that is repeatedly performed in order to determine a series of positions and orientations for the virtual object 108, so that the virtual object appears to be travelling ahead of the vehicle 103 along the proposed route.

The apparent position of the virtual object 108 within the environment 107 is maintained within a limited distance from the vehicle 103, but may be varied between lower and upper limits of, for example, 2 and 8 metres. The apparent distance from the vehicle 103 to the virtual object 108 is typically reduced at times when the environment mapping means 714 indicates that the suitable speed for the next portion of the route is less than the current speed of the vehicle 103. Similarly, the apparent distance is typically increased when the maximum or suitable speed for the next portion of the route is greater than the current speed of the vehicle.

An eye position detection means 716 is arranged to receive image data, including representations of at least one eye 105 of the user 106, from the imaging means 114. The eye position detection means 716 is configured to analyse each of the images to generate the positional data representative of a position of at least one eye 105 of the user 106.

A graphical image generation means 717 is configured to produce graphical image data in dependence on data received from the processing means 715, indicative of the proposed position and orientation of the virtual object 108, and positional data received from the eye position detection means 716. The graphical image data produced by the graphical image generation means 717 is provided to the head-up display 102 to cause it to display the virtual object 108 so as to appear at the proposed position and with the proposed orientation with respect to the environment.

Figure 8:
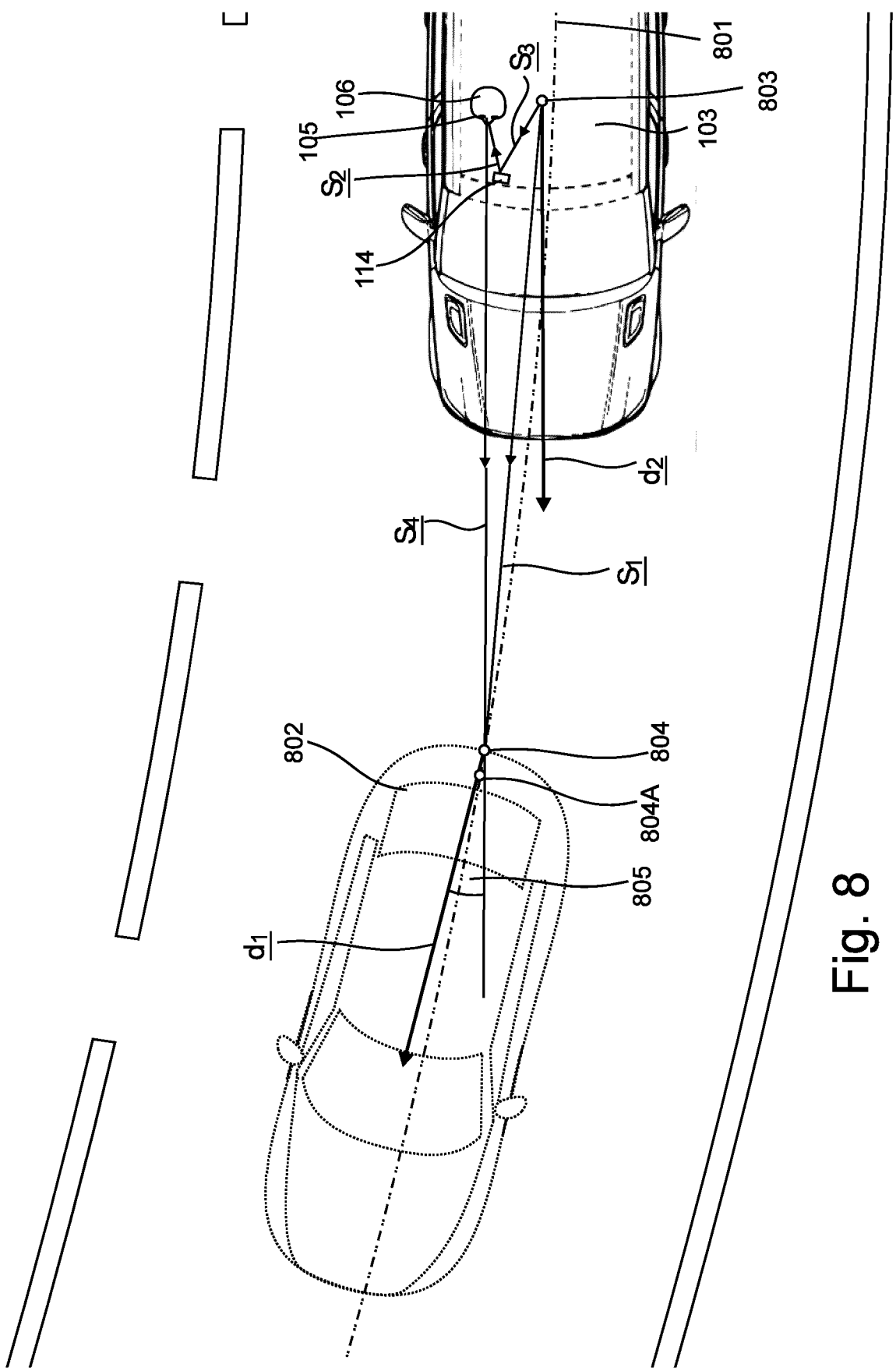
FIG. 8 is a plan view of the vehicle shown in FIG. 1.

An illustration of how the graphical image data is produced is provided by FIG. 8, which shows a plan view of the vehicle 103 on a proposed route 801. An object 802 representing the car 202 to be displayed on the head-up display 102 is shown in FIG. 8 (in dotted outline) at a proposed position 804 on the route 801 ahead of the vehicle 103. As discussed above, the route 801 may be generated by the route planner 704 and a position 803 of the vehicle 103 may be determined from data received from the GPS receiver 702 and/or other environment sensing means 113 such as the IMU 705 and the odometer 709. The position 803 of the vehicle 103 is shown in the example of FIG. 8 at the centre of the vehicle 103, but it will be understood that the position 803 may be defined to be at the position of another point on the vehicle 103.

The orientation of the object 802 may be represented by a direction vector $d_1$ and the orientation of the vehicle 103 may be represented by a direction vector $d_2$ as shown in FIG. 8.

The proposed position 804 of the object 802, relative to the position 803 of the vehicle 103 is represented by a position vector $s_1$. The positional data representative of the position of the user's eyes 105 from the imaging means 114 may be also represented by a position vector $s_2$. The position of the imaging means 114 from the position 803 of the vehicle 103 is a fixed displacement with a vector $s_3$. Therefore, a position vector $s_4$ from the position of the user's eyes 105 to the proposed position 804 of the object 802 may be determined (as $s_1$-$s_2$-$s_3$) and the orientation of the object 802 as viewed by the user 106 may be determined as angle 805 between the vector $d_1$ and the vector $s_4$ from the position of the user's eyes 105 to the proposed position 804.

The above described vectors and angles are shown in FIG. 8 as 2-dimensional, but, in the present embodiment, in order for the displayed car 202 to appear to be correctly positioned in the exterior environment 107 and resting on solid ground (such as the road 205 in FIG. 2), the vectors and angles are 3-dimensional.

The object 802 may be represented by a 3-dimensional model that defines the shape of the car 202 to be presented on the head-up display 103. Therefore graphical data representing a two dimensional view of the car 202 may be generated from: the 3-dimensional model; the distance from the eyes 105 of the user 106 to the proposed position 804 (i.e. $|s_4|$); and the angle 805.

Proposed positions, such as proposed position 804, may be determined repeatedly with a fixed period between each determination, to generate a series of images for presentation on the head-up display 102. Following the determination of the proposed position 804, the next proposed position 804A is determined to be on the route 801 a distance ahead of the proposed position 804. This distance depends on the speed of the vehicle 103 and a determined proposed speed for the vehicle 103 at the proposed position 804. For example, the proposed speed may be maximum legal speed or suitable speed for the vehicle 103 at the proposed position 804 on the route 801. The next proposed position 804A is chosen such that if the speed of the vehicle 103 is less than the maximum speed or suitable speed for the vehicle then the distance from the current proposed position 804 to the next proposed position 804A may be made larger than the distance travelled by the vehicle 103 during the fixed period. Therefore, the distance from the vehicle 103 to the proposed position 804A is increased. Similarly, if the speed of the vehicle 103 is greater than the maximum speed or suitable speed for the vehicle then the distance from the current proposed position 804 to the next proposed position 804A may be made smaller than the distance travelled by the vehicle 103 during the fixed period. Therefore, the distance from the vehicle 103 to the proposed position 804A is decreased. The distance between the vehicle 103 and the proposed positions (such as 804 and 804A) may be increased and decreased within limits, such as a lower limit of 2 metres and an upper limit of 8 metres, as described previously.

Figure 9:
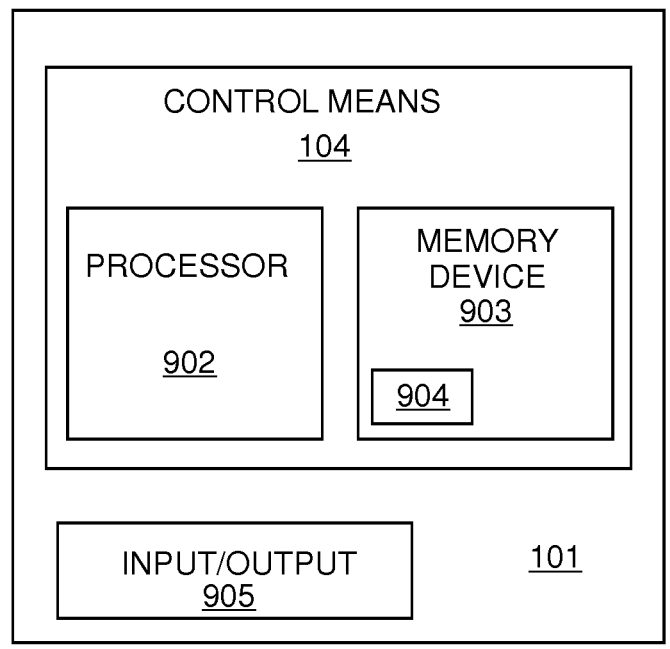
FIG. 9 is a schematic diagram of the apparatus shown in FIG. 1.
Figure 9:
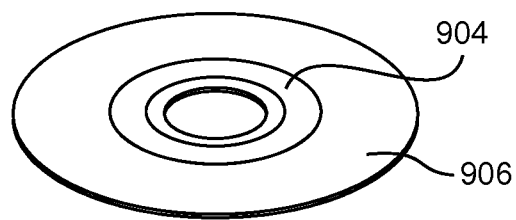

Apparatus 101 comprising the control means 104 is shown schematically in FIG. 9. The control means 114 comprises one or more electronic processors 902 and one or more electronic memory devices 903. A computer program 904 comprising instructions is stored in the memory device 903 and the one or more electronic processors 902 are configured to execute the instructions to control the head-up display (102 in FIG. 1) of the vehicle 103, to cause it to display a representation of a car (202 in FIG. 2) as described herein.

In embodiments in which the control means 104 comprises several processors 902, the processors may be located within a single module or may be distributed over several different modules. For example, the process performed by eye position detection means 716 (shown in FIG. 7) may be performed by a processor 902 of the control means 104 that is located within a camera 114 configured to capture images of the eyes 105 of the user 106, while the process performed by the graphical image generation means 717 (shown in FIG. 7), may be performed by a different processor 902, located within a unit that includes the display device of the head-up display 102. In an alternative embodiment, the control means 104 comprises a single processor 902 that performs the functions of environment mapping, determination of position and orientation, and graphical image generation (respectively 714, 715 and 717 shown in FIG. 7).

The apparatus 101 may also comprise input/output means 905 for receiving and transmitting communications to other electronic devices. The input/output means 905 may comprise one or more transceivers for communicating with other devices over data buses, such as a controller area network bus (CAN bus) of the vehicle 103.

The computer program 904 may be transferred to the memory device 903 via a non-transitory computer readable medium, such as a CD-ROM 906 or a portable memory device, or via a network, such as a wireless network.

Figure 10:
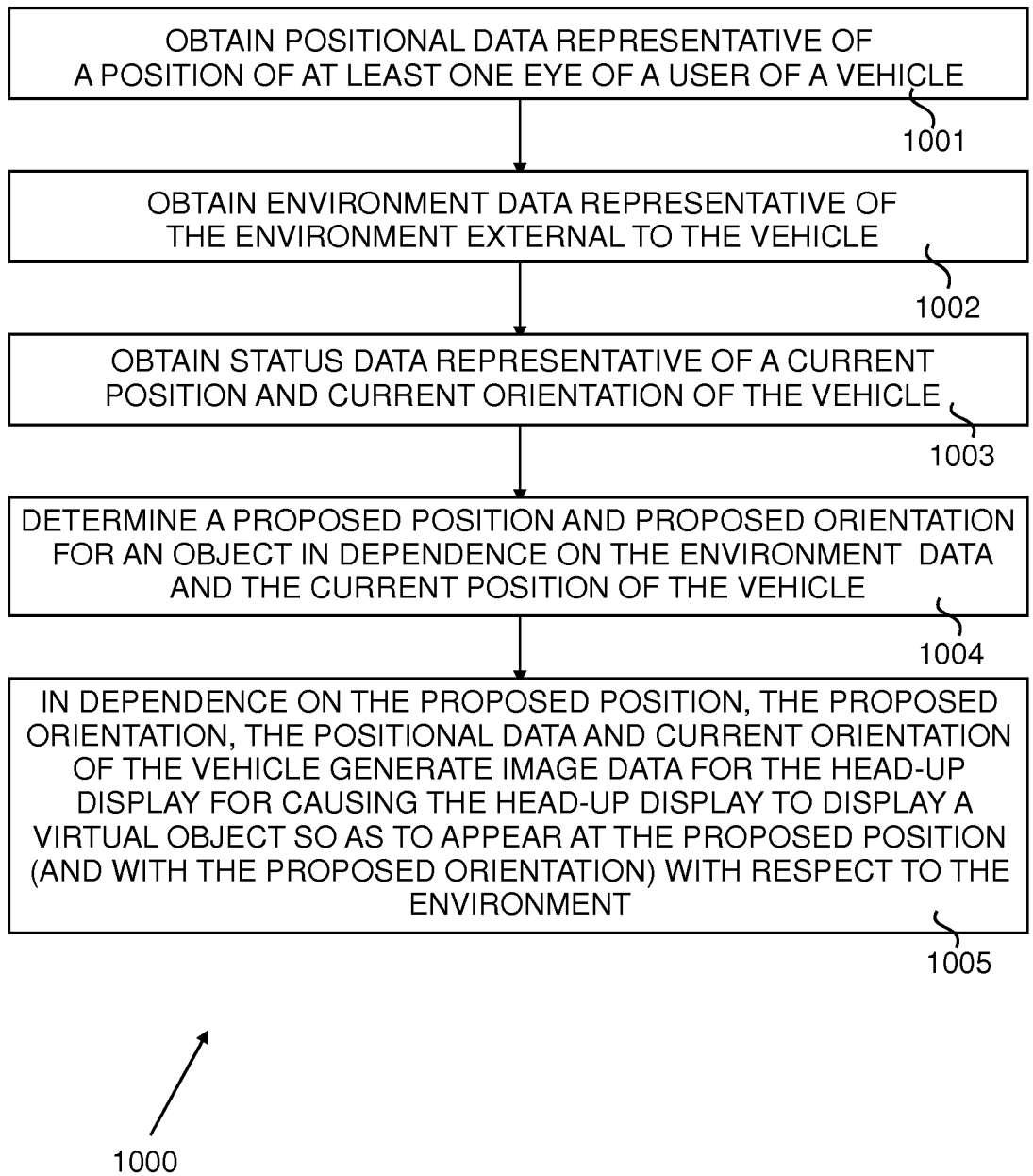
FIG. 10 is a flowchart illustrating an embodiment of a method in accordance with the invention.

A flowchart illustrating a method 1000, performable by the apparatus 101, of controlling a head-up display of a vehicle is shown in FIG. 10. At block 1001 of the method 1000, positional data representative of a position of at least one eye of a user of a vehicle is obtained. For example, the positional data may be obtained from the imaging means 114 comprising one or more cameras arranged to capture images containing representations of at least one of a user's eyes 105, so that the position of the at least one eye is obtained from one or more captured images.

At block 1002, the method 1000 obtains environment data representative of the environment external to the vehicle. For example, the environment data may comprise data that defines the contours of the route immediately ahead of the vehicle.

At block 1003, the method 1000 obtains status data representative of a current position and current orientation of the vehicle, and at block 1004 a proposed position and proposed orientation for an object (such as object 802 shown in FIG. 8) in dependence on the environment data and the current position of the vehicle is determined. For example, a next proposed position may be determined from a current proposed position as described above with reference to FIG. 8. The proposed position and proposed orientation may be for a 3-dimensional object such as a car.

At block 1005, in dependence on the proposed position, the proposed orientation, the positional data and current orientation of the vehicle, the method 1000 generates image data for the head-up display for causing the head-up display to display a virtual object so as to appear at the proposed position and with the proposed orientation with respect to the environment. For example, the image data may be generated as described above with reference to FIG. 8, and therefore the virtual object 108 (shown in FIGS. 1 and 2) provides a view of a 3-dimensional object, such as the displayed car 202 (shown in FIG. 2).

In an alternative embodiment, an alternative virtual object 108 (shown in FIG. 1) may be a simple 2-dimensional object, such as an arrow, which has a shape or orientation that changes to show the direction of the route immediately ahead of the vehicle. However, like the virtual object 108 in the form of the car 202, the size and apparent distance to the alternative virtual object 108 is controlled to convey varying speeds to the user 106.

Figure 11:
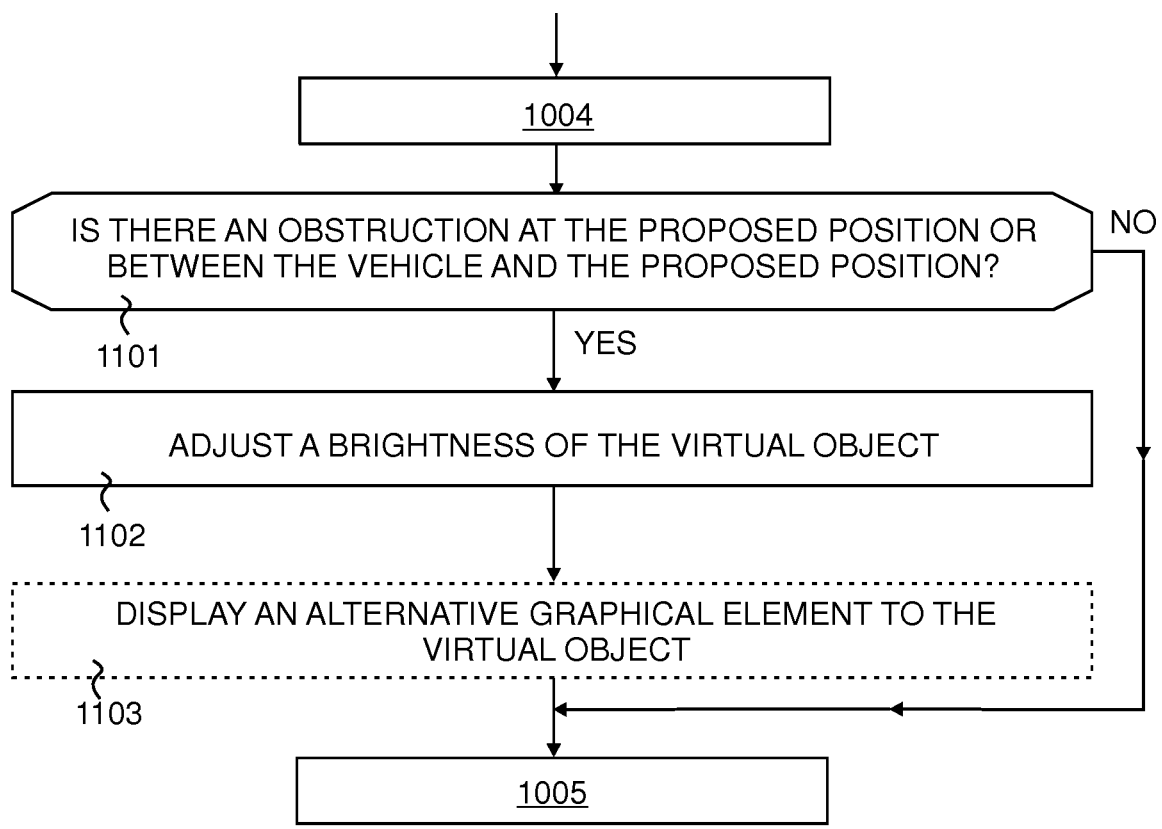
FIG. 11 is a flowchart illustrating additional processes included within the method of FIG. 10 in an embodiment of the invention.

Additional processes that may be included within the method 1000 are shown in FIG. 11. After determining a proposed position for the object at block 1004, it is determined, at block 1101, whether there is an obstruction at the proposed position or between the current position of the vehicle and the proposed position. For example, distance sensors 712, a lidar system 711 or a radar system 710 may provide data indicating that an obstruction, such as another vehicle, is between the vehicle 103 and the proposed position of the object. If there is such an obstruction present, the brightness of the virtual object is adjusted at block 1102. Typically the brightness is reduced so that the user 106 is not confused or distracted by seeing two vehicles that appear to share the same space, or apparently seeing the virtual object (i.e. the car 202) through a vehicle that provides the obstruction. In an embodiment, the brightness is reduced to zero so that the virtual object is not visible to the user. When the obstruction is no longer at the proposed position or between the vehicle and the proposed position, the brightness may be increased again so that the virtual object is once again visible.

In an embodiment, an alternative graphical element to the usual virtual object is displayed, as indicated at block 1103, when the brightness of the virtual object is reduced at block 1102. For example, the alternative graphical element may comprise an arrow 602 as described above with reference to FIG. 6.

Figure 12:
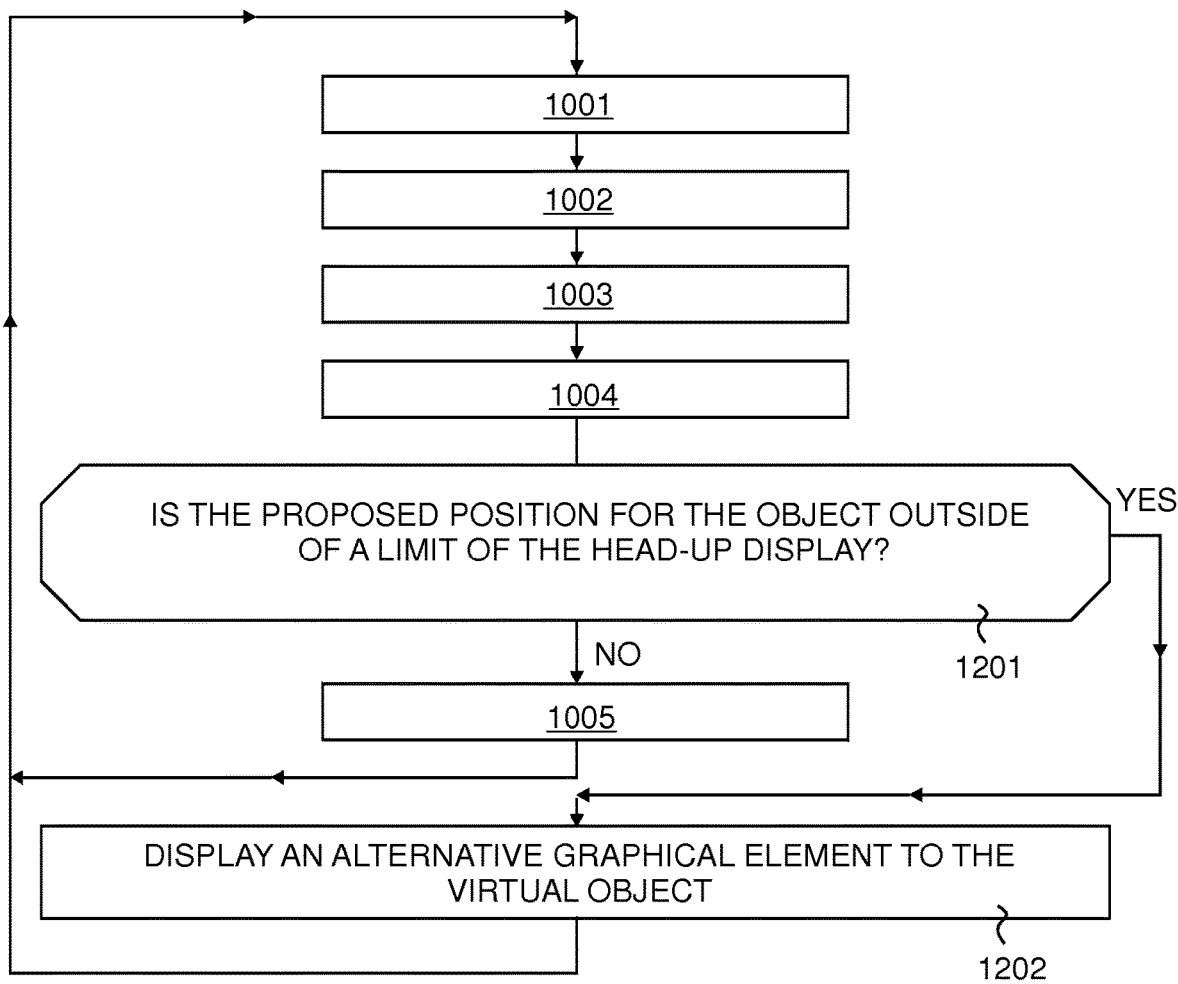
FIG. 12 is a flowchart illustrating additional processes included within the method of FIG. 10 in an embodiment of the invention.

An embodiment of the method 1000 including additional processes is illustrated in the flowchart shown in FIG. 12. Following the determination of the proposed position and proposed orientation for an object at block 1004, it is determined, at block 1201 whether the proposed position for the object is outside of a limit of the head-up display, so that the virtual object 108 (such as the car 202 shown in FIG. 2) is not present in the field of view of the head-up display 102. If it is outside of the limit of the head-up display, an alternative graphical element is displayed at block 1202. The processes at blocks 1001 to 1004 and blocks 1201 and 1202 are then repeatedly performed until it is determined at block 1201 that the virtual object 108 is once again within the limits of the head-up display.

When it is determined that the virtual object 108 is within the limits of the head-up display at block 1201, the process at block 1005 is performed wherein, in dependence on the proposed position, the proposed orientation, the positional data and current orientation of the vehicle, the method 1000 generates image data for the head-up display for causing the head-up display to display a virtual object so as to appear at the proposed position and with the proposed orientation with respect to the environment. The processes at blocks 1001 to 1004, 1201 and 1005 are then repeatedly performed until it is determined that the virtual object (such as virtual object 108) is no longer within the limits of the head-up display at block 1201. An example of the method illustrated by FIG. 12 was described above with reference to FIG. 5.

Figure 13:
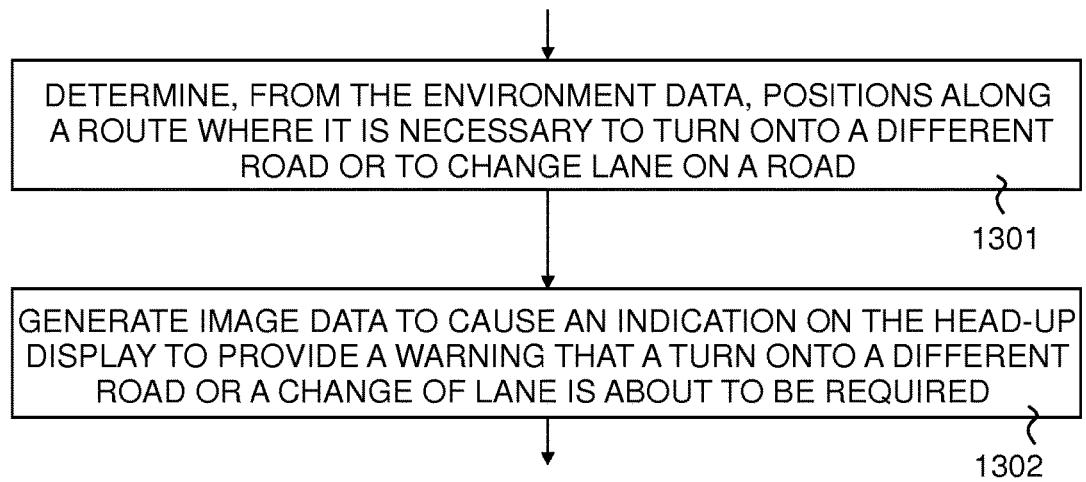
FIG. 13 is a flowchart illustrating additional processes included within the method of FIG. 10 in an embodiment of the invention.

Additional processes that may be included within an embodiment of the method 1000 are shown in the flowchart of FIG. 13, these additional processes may be performed before block 1004 or included as a sub-routine within any of blocks 1002 to 1004 as may be desired. At block 1301, the method 1000 determines from the environment data positions along a route where it is necessary to turn onto a different road or to change lane on a road. At block 1302, image data is generated to cause an indication on the head-up display to provide a warning that a turn onto a different road or a change of lane is about to be required. For example, the indication may comprise movement of the virtual object 108 towards one side of the field of view 201 of the head-up display 102 and/or, where the virtual object 108 represents a vehicle, such as the car 202, the indication may comprise illumination of a portion of the virtual image 108 that represents an indicator light 304 of that vehicle. An example of this arrangement was described above with reference to FIG. 3.

Figure 14:
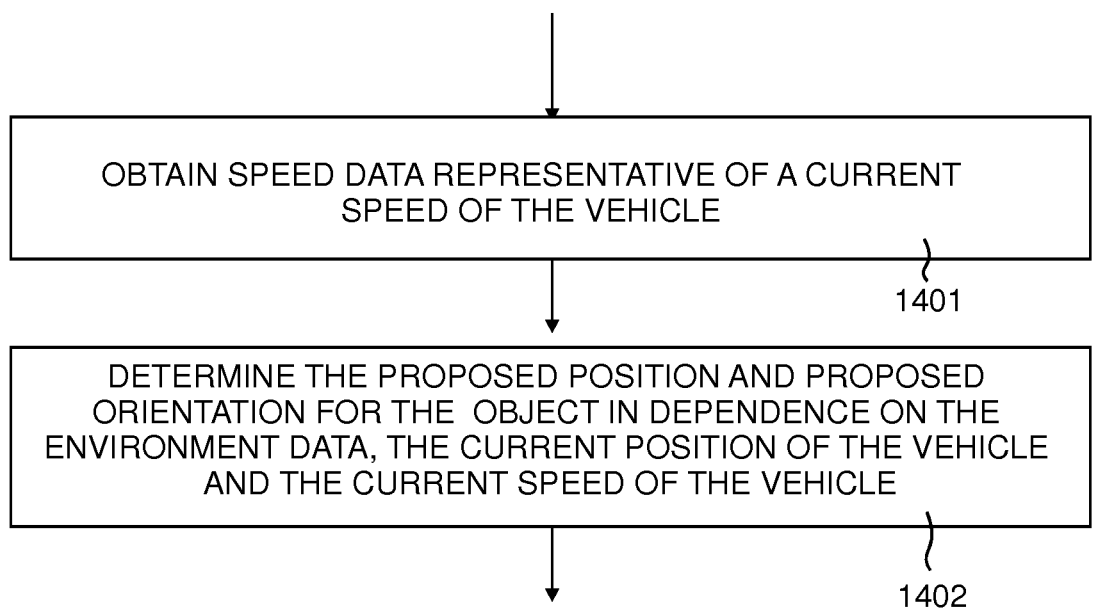
FIG. 14 is a flowchart illustrating an additional process included within the method of FIG. 10 in an embodiment of the invention.

An additional process that may be included within an embodiment of the method 1000 is shown in the flowchart of FIG. 14. The process at block 1401 obtaining speed data representative of a current speed of the vehicle. The speed data may be obtained from data received from an odometer or speedometer 609 or the GPS receiver 602. At block 1402, which may be performed as a sub-routine of block 1004 of the method 1000, the proposed position and proposed orientation for the object are determined in dependence on the environment data, the current position of the vehicle and the current speed of the vehicle. For example, the proposed position of the object may be determined from a previously determined proposed position of the object and a displacement determined from the speed of the vehicle in a direction determined by the proposed route. However, as described above with reference to FIG. 8, the proposed position may further depend on the environment data, which may indicate that an increase in vehicle speed is possible, in which case the magnitude of the displacement may be increased, or that a reduction in vehicle speed is required, in which case the magnitude of the displacement may be reduced.

For purposes of this disclosure, it is to be understood that the control means or controller(s) described herein can each comprise a control unit or computational device having one or more electronic processors. A vehicle and/or a system thereof may comprise a single control unit or electronic controller or alternatively different functions of the controller(s) may be embodied in, or hosted in, different control units or controllers. A set of instructions could be provided which, when executed, cause said controller(s) or control unit(s) to implement the control techniques described herein (including the described method(s)). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium (e.g., a non-transitory storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM ad EEPROM); flash memory; or electrical or other types of medium for storing such information/instructions.

The blocks illustrated in the FIGS. 10 to 14 may represent steps in a method and/or sections of code in the computer program 904. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed. For example, in an alternative embodiment the head-up display is located in another type of vehicle such as an aircraft, a boat or ship.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An apparatus for controlling a head-up display of a vehicle, the apparatus comprising a controller configured to:
   obtain positional data representative of a position of an eye of a user of the vehicle;
   obtain environment data representative of an environment external to the vehicle;
   obtain status data representative of a current position of the vehicle;
   determine a proposed position and proposed orientation in dependence on the environment data and the status data;
   in dependence on the proposed position, the proposed orientation and the positional data, generate image data for the head-up display for causing the head-up display to display a virtual object so as to appear at the proposed position and with the proposed orientation with respect to the environment; and
   display an alternative graphical element in dependence on the proposed position being outside of a limit of the head-up display in which the virtual object is not present in a field of view of the head-up display.

2. The apparatus according to claim 1, wherein the status data is additionally representative of a current orientation of the vehicle and the controller is configured to generate image data in dependence on the current orientation of the vehicle.

3. The apparatus according to claim 1, wherein the environment data comprises route data representative of a route for the vehicle, the proposed position is on the route and the proposed orientation is indicative of a direction along the route.

4. The apparatus according to claim 1, wherein the controller is configured to obtain speed data representative of a current speed of the vehicle, and determine the proposed position and proposed orientation in dependence on the environment data, the status data and the current speed of the vehicle.

5. The apparatus according to claim 1, wherein the controller is configured to adjust an apparent distance between the vehicle and the virtual object.

6. The apparatus according to claim 5, wherein the controller is configured to determine from the environment data a proposed speed for the vehicle at the proposed position, and to decrease the apparent distance between the vehicle and the virtual object in dependence on the current vehicle speed being greater than the proposed speed.

7. The apparatus according to claim 5, wherein the controller is configured to decrease the apparent distance between the vehicle and the virtual object in dependence on the environment data being indicative of the vehicle approaching a section of a road/route having at least one of: a legal speed limit which is less than the current speed of the vehicle, a bend, a road junction, and traffic moving slower than the vehicle.

8. The apparatus according to claim 5, wherein the controller is configured to determine from the environment data a proposed speed for the vehicle at the proposed position, and to increase the apparent distance between the vehicle and the virtual object in dependence on the current speed of the vehicle being less than the proposed speed.

9. The apparatus according to claim 1, wherein the control means is configured to adjust a brightness of the virtual object in dependence on a determination that an obstruction is at the proposed position or between the vehicle and the proposed position.

10. The apparatus according to claim 9, wherein the controller is configured to prevent the display of the virtual object in dependence on a determination that an obstruction is at the proposed position or between the vehicle and the proposed position.

11. The apparatus according to claim 9, wherein the controller is configured to display an alternative graphical element to the virtual object in dependence on a determination that an obstruction is at the proposed position or between the vehicle and the proposed position.

12. The apparatus according to claim 1, wherein the controller is configured to determine the proposed position and the proposed orientation for a 3-dimensional object and to generate the image data for displaying the virtual object from a 3-dimensional model of the 3-dimensional object in dependence on the positional data, the status data and the proposed orientation.

13. The apparatus according to claim 1, wherein the virtual object comprises a 2-dimensional virtual object.

14. The apparatus according to claim 1, wherein the alternative graphical element provides an indication of a direction of a route for the vehicle.

15. The apparatus according to claim 1, wherein the controller is configured to determine, from the environment data, positions along a route where it is necessary to change direction or to turn onto a different road or to change of lane on a road while the vehicle is driven, and generate image data to cause an indication on the head-up display to provide a warning that a change in direction or a turn onto a different road or a change of lane is about to be required.

16. The apparatus according to claim 1, wherein the controller is configured to receive environment data from at least one of: a satellite navigation module comprising a digitally stored map, one or more distance sensors, a radar system, a lidar system, and a camera.

17. The apparatus according to claim 1, wherein the controller is configured to determine the current position and/or the current orientation of the vehicle from data obtained from a satellite navigation device, an inertial measurement unit (IMU), an accelerometer, a gyroscope and an odometer.

18. A control apparatus of claim 1 comprised in a vehicle.

19. A method of controlling a head-up display of a vehicle, the method comprising:
  obtaining positional data representative of a position of an eye of a user of the vehicle;
  obtaining environment data representative of the environment external to the vehicle;
  obtaining status data representative of a current position of the vehicle;
  determining a proposed position and proposed orientation in dependence on the environment data and the status data of the vehicle;
  in dependence on the proposed position, the proposed orientation and the positional data, generating image data for the head-up display for causing the head-up display to display a virtual object so as to appear at the proposed position and with the proposed orientation with respect to the environment; and
  displaying an alternative graphical element in dependence on the proposed position being outside of a limit of the head-up display in which the virtual object is not present in a field of view of the head-up display.

20. A computer program which when executed by a processor causes the processor to perform the method of claim 19, wherein the computer program is stored on a non-transitory computer-readable storage medium.

* * * * *